(12) United States Patent
Lafleur

(10) Patent No.: US 12,460,535 B2
(45) Date of Patent: Nov. 4, 2025

(54) DOWNHOLE PRESSURE/TEMPERATURE MONITORING OF ESP INTAKE PRESSURE AND DISCHARGE TEMPERATURE WITH A GAUGE SENSOR EMPLOYING AN OFFSET CENTERLINE

(71) Applicant: Halliburton Energy Services, Inc., Houston, TX (US)

(72) Inventor: Louis Francis Lafleur, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 358 days.

(21) Appl. No.: 17/711,711

(22) Filed: Apr. 1, 2022

(65) Prior Publication Data

US 2023/0313670 A1    Oct. 5, 2023

(51) Int. Cl.
*E21B 47/008* (2012.01)
*E21B 43/12* (2006.01)
*E21B 47/06* (2012.01)
*E21B 47/13* (2012.01)

(52) U.S. Cl.
CPC .......... *E21B 47/008* (2020.05); *E21B 43/128* (2013.01); *E21B 47/06* (2013.01); *E21B 47/13* (2020.05)

(58) Field of Classification Search
None
See application file for complete search history.

(56) References Cited

U.S. PATENT DOCUMENTS

| 4,624,309 A | 11/1986 | Schnatzmeyer |
| 4,660,638 A | 4/1987 | Yates, Jr. |
| 5,457,988 A | 10/1995 | Delatorre |
| 5,597,042 A | 1/1997 | Tubel et al. |
| 5,706,892 A | 1/1998 | Aeschbacher, Jr. et al. |

(Continued)

FOREIGN PATENT DOCUMENTS

WO    2017099968 A1    6/2017

*Primary Examiner* — Eman A Alkafawi
*Assistant Examiner* — Dilara Sultana
(74) *Attorney, Agent, or Firm* — Scott Richardson; Parker Justiss, P.C.

(57) ABSTRACT

Provided is a gauge sensor, a sensing system, and a well system. The gauge sensor, in one aspect, includes a sensor region, the sensor region including one or more pressure sensors or temperature sensors contained therein. In accordance with this aspect, the gauge sensor additionally includes a first tubing encapsulated conductor (TEC) termination region coupled to an uphole end of the sensor region, the first TEC termination region including a first TEC termination having a first TEC centerline ($C_{LS1}$). The gauge sensor may further include a second tubing encapsulated conductor (TEC) termination region coupled to a downhole end of the sensor region, the second TEC termination region including a second TEC termination having a second TEC centerline ($C_{LS2}$), and further wherein the first TEC centerline ($C_{LS1}$) and the second TEC centerline ($C_{LS2}$) are offset from one another by a distance ($D_S$).

19 Claims, 22 Drawing Sheets

(56) References Cited

U.S. PATENT DOCUMENTS

| | | | |
|---|---|---|---|
| 6,116,085 A | 9/2000 | Moffatt et al. | |
| 6,655,452 B2 | 12/2003 | Zillinger | |
| 6,915,686 B2 | 7/2005 | Baustad | |
| 7,648,179 B2* | 1/2010 | Webb | E21B 17/04 |
| | | | 166/242.6 |
| 8,528,395 B2 | 9/2013 | Griffiths et al. | |
| 9,347,307 B2 | 5/2016 | McMillon et al. | |
| 2010/0258351 A1 | 10/2010 | Hooks et al. | |
| 2013/0220599 A1 | 8/2013 | Rae | |
| 2016/0153276 A1* | 6/2016 | Park | E21B 47/135 |
| | | | 166/380 |
| 2016/0251929 A1 | 9/2016 | Wong et al. | |
| 2018/0363431 A1* | 12/2018 | Crowley | F04D 13/10 |
| 2019/0271196 A1* | 9/2019 | Cochran | E21B 34/02 |
| 2019/0316440 A1 | 10/2019 | Honeker et al. | |
| 2020/0080380 A1* | 3/2020 | Gorrara | E21B 7/06 |
| 2020/0109619 A1 | 4/2020 | Coste et al. | |

* cited by examiner

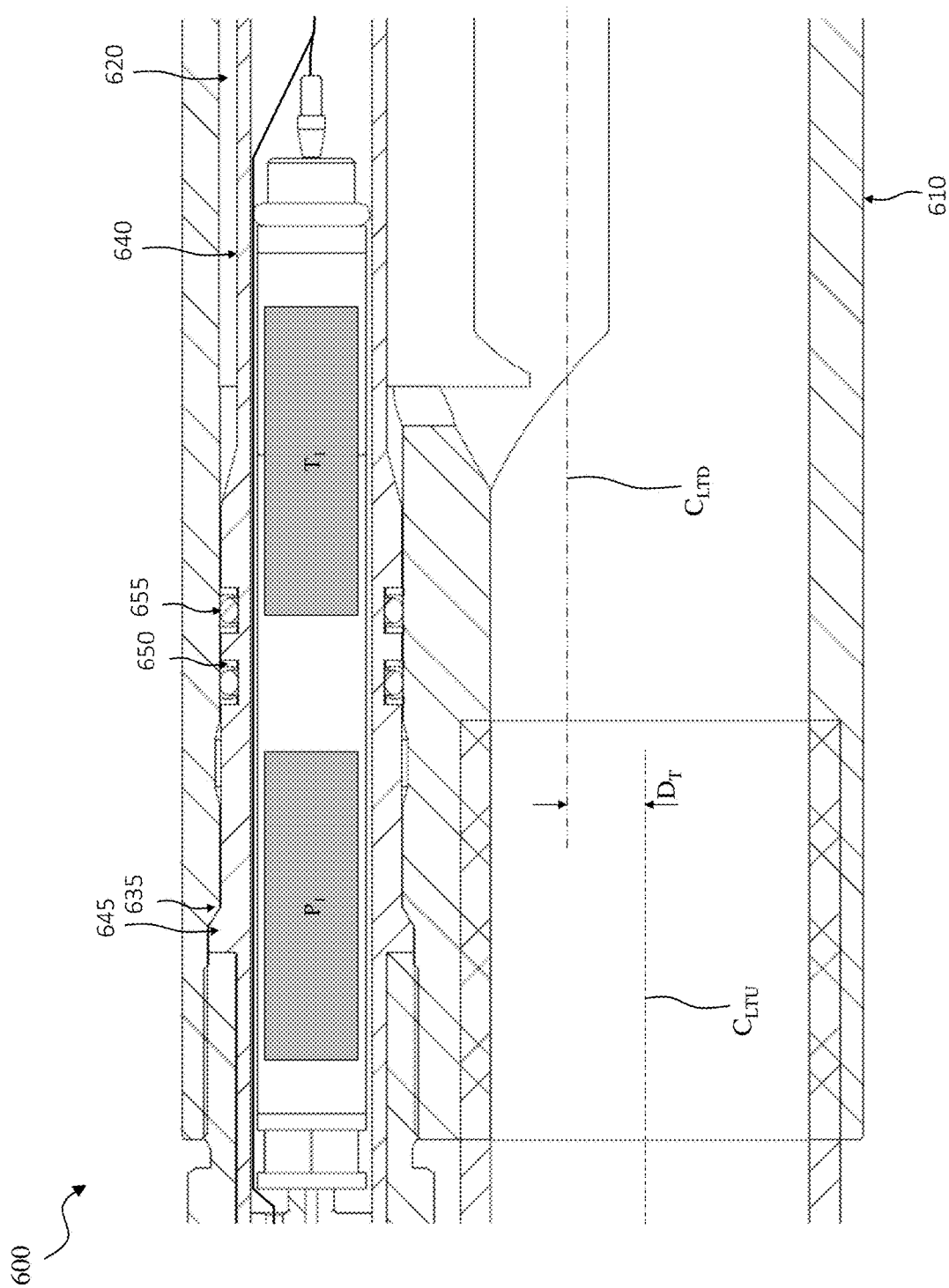

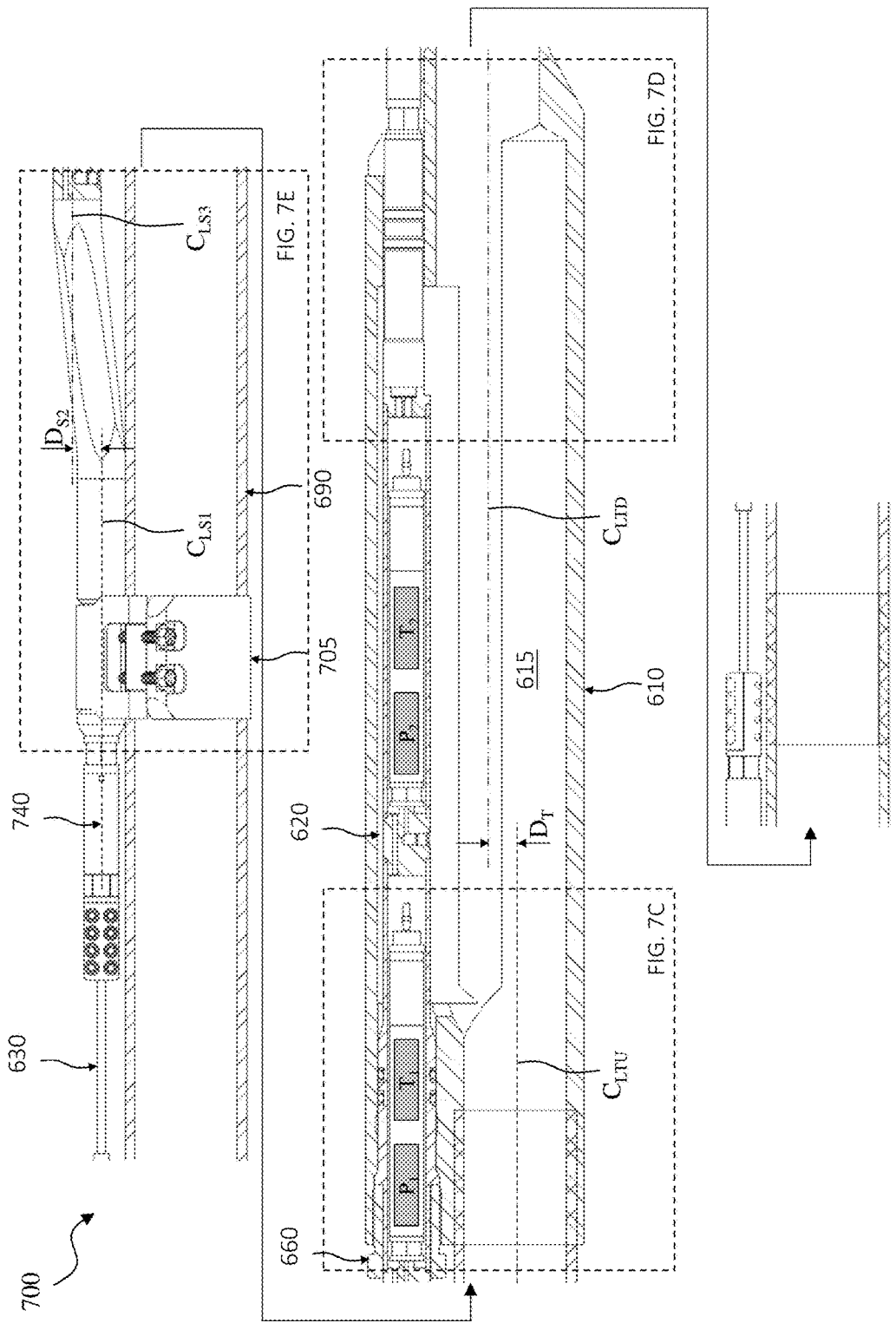

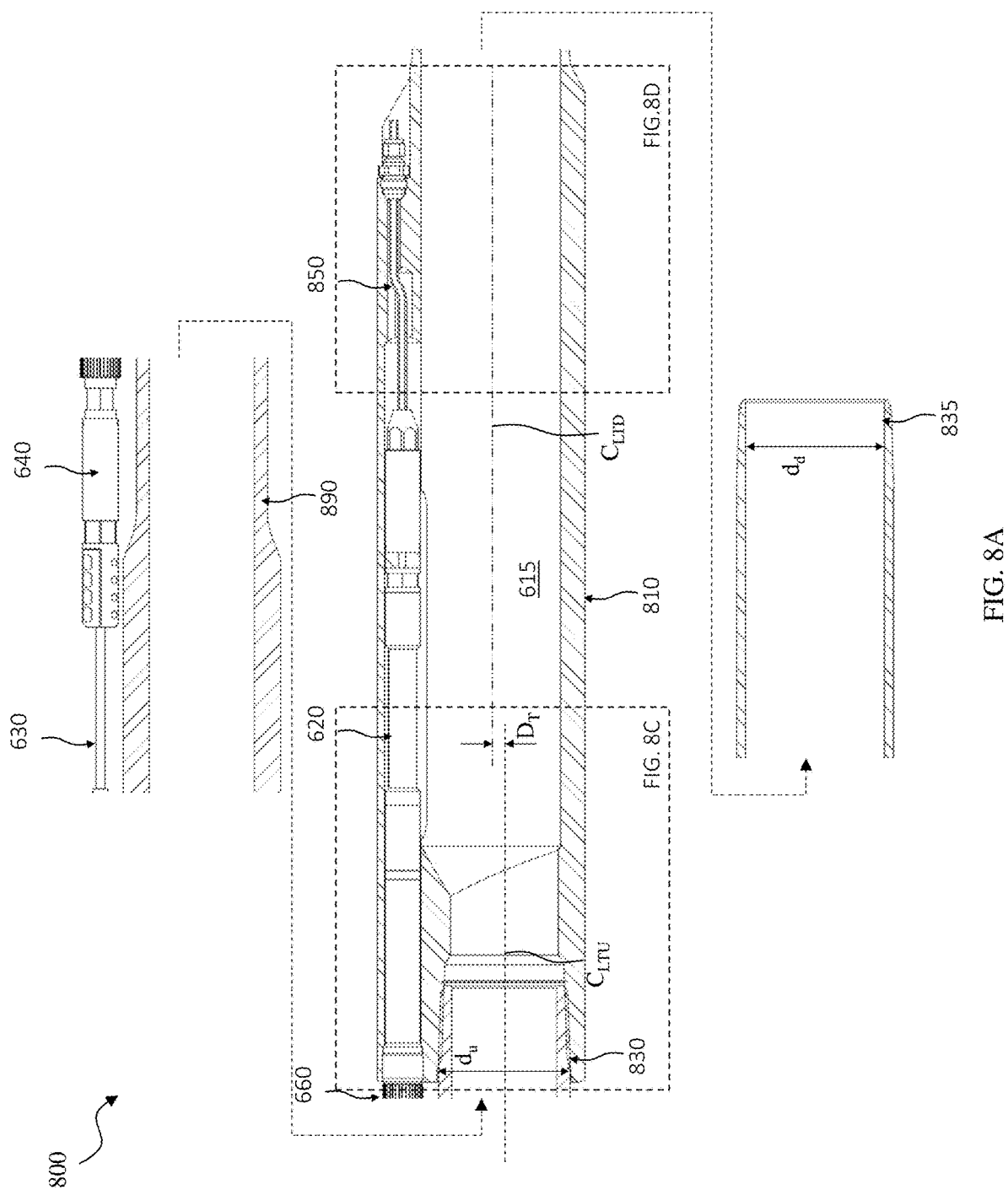

DOWNHOLE PRESSURE/TEMPERATURE MONITORING OF ESP INTAKE PRESSURE AND DISCHARGE TEMPERATURE WITH A GAUGE SENSOR EMPLOYING AN OFFSET CENTERLINE

BACKGROUND

Electric submersible pumps (ESPs) may be deployed for any of a variety of pumping purposes. For example, where a substance (e.g., hydrocarbons in a subterranean formation) does not readily flow responsive to existing natural forces, an ESP may be implemented to artificially lift the substance. If an ESP fails during operation, the ESP must be removed from the pumping environment and replaced or repaired, either of which results in a significant cost to an operator.

The ability to predict an ESP failure, for example by monitoring the operating conditions and parameters in and around the ESP, provides the operator with the ability to change the operation of the ESP, perform preventative maintenance on the ESP or replace the ESP in an efficient manner, reducing the cost to the operator. However, when the ESP is in a wellbore, it is difficult to monitor the operating conditions and parameters with sufficient accuracy to accurately predict ESP failures.

BRIEF DESCRIPTION

Reference is now made to the following descriptions taken in conjunction with the accompanying drawings, in which:

FIGS. 6A to 6D illustrate various different views of a sensing system (e.g., installed sensing system) according to any of the embodiments, aspects, applications, variations, designs, etc. disclosed herein;

FIGS. 7A to 7E illustrate yet another design of a sensing system designed, manufactured and operated according to one or more embodiments of the disclosure; and FIGS. 8A to 8D illustrate yet another design of a sensing system designed, manufactured and operated according to one or more alternative embodiments of the disclosure.

DETAILED DESCRIPTION

Figure 1:
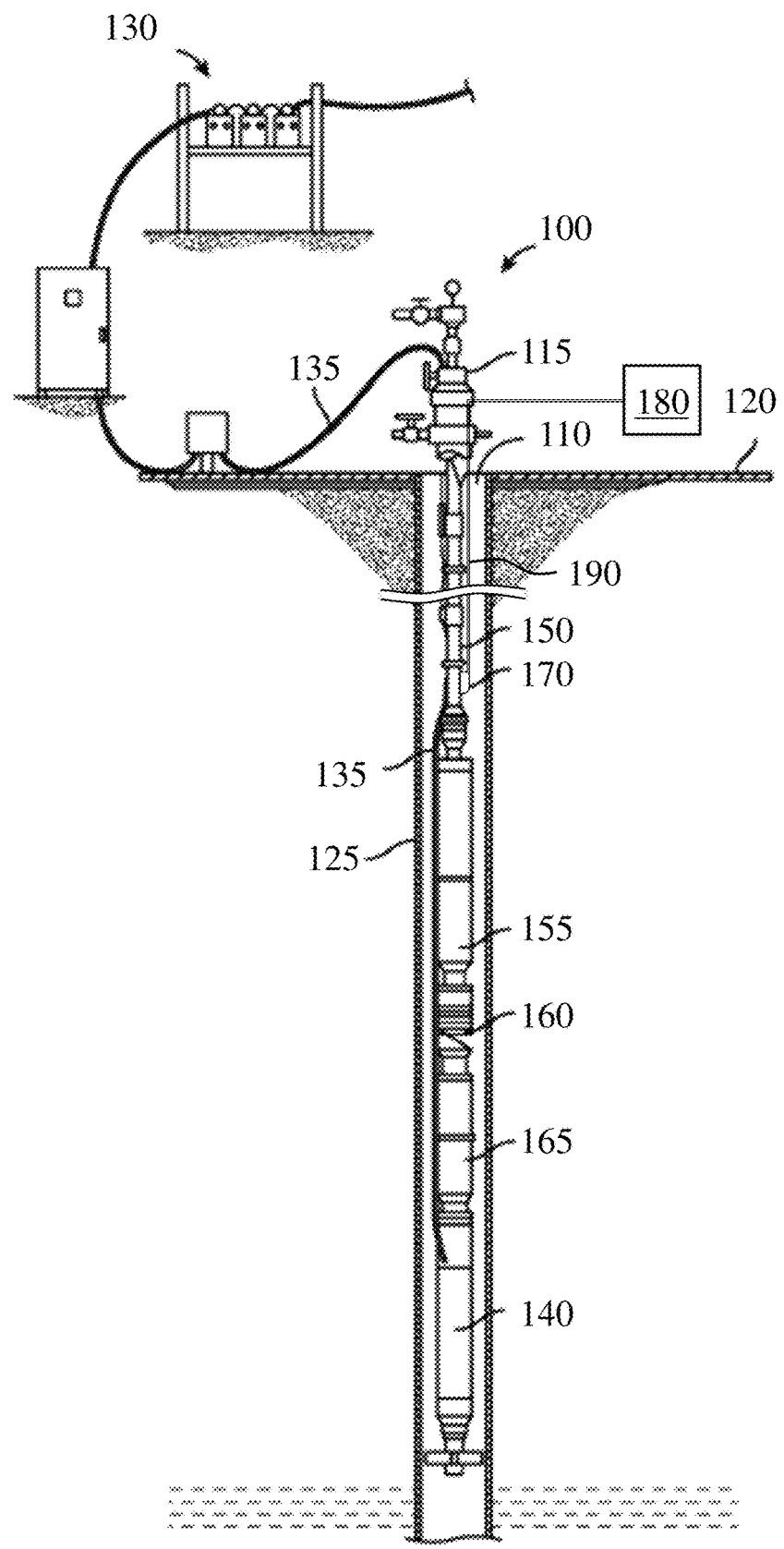
FIG. 1 illustrates a perspective view of a well system including an exemplary operating environment that the apparatuses, systems and methods disclosed herein may be employed.

In the drawings and descriptions that follow, like parts are typically marked throughout the specification and drawings with the same reference numerals, respectively. The drawn figures are not necessarily, but may be, to scale. Certain features of the disclosure may be shown exaggerated in scale or in somewhat schematic form and some details of certain elements may not be shown in the interest of clarity and conciseness.

The present disclosure may be implemented in embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results. Moreover, all statements herein reciting principles and aspects of the disclosure, as well as specific examples thereof, are intended to encompass equivalents thereof. Additionally, the term, "or," as used herein, refers to a non-exclusive or, unless otherwise indicated.

Unless otherwise specified, use of the terms "connect," "engage," "couple," "attach," or any other like term describing an interaction between elements is not meant to limit the interaction to direct interaction between the elements and may also include indirect interaction between the elements described.

Unless otherwise specified, use of the terms "up," "upper," "upward," "uphole," "upstream," or other like terms shall be construed as generally away from the bottom, terminal end of a well, regardless of the wellbore orientation; likewise, use of the terms "down," "lower," "downward," "downhole," "downstream," or other like terms shall be construed as generally toward the bottom, terminal end of a well, regardless of the wellbore orientation. Use of any one or more of the foregoing terms shall not be construed as denoting positions along a perfectly vertical or horizontal axis. Unless otherwise specified, use of the term "subterranean formation" shall be construed as encompassing both areas below exposed earth and areas below earth covered by water, such as seawater or fresh water.

The present disclosure is based, at least in part, on the recognition that is may be desirable to provide a continuation of the Tubing Encapsulated Conductor (TEC) or other power/data conductor below a point where a pressure and/or temperature sensor or other electrically operated device is located in a downhole sensing system. With this in mind, the present disclosure envisions adding an internal wire passage coupling a first TEC termination region and a second TEC termination region of a gauge sensor. Such a configuration may eliminate the requirement of a TEC splitter and associated additional cable splices, which inherently introduce potential leak paths.

The present disclosure is also based, at least in part, on the recognition that while there is a desire for concentricity of tools used within wellbores, such is not always possible without significantly increasing the outside diameter (OD) of the tool. For example, in sensing systems employing a gauge mandrel and a gauge sensor, one option is to increase the OD of the gauge mandrel to accommodate the gauge sensor in a sidewall thickness thereof, which would retain the concentricity of the sensing system. Unfortunately, the OD of the sensing system might be too large for most wellbores. A second option, however, is to locate the gauge sensor within a gauge cavity in an upset section in the gauge mandrel. While this option reduces the OD of the sensing system, it negatively affects the concentricity of the sensing system.

With this in mind, the present disclosure further recognized that the degree of concentricity may be more important to the tools located below the sensing system, as compared to tools located above, or vice versa. Accordingly, the present disclosure has designed a gauge mandrel that has different concentricity values at an uphole end thereof and a downhole end thereof, for example by changing the centerline of the two. In at least one embodiment, the present disclosure recognizes that the downhole end of the gauge mandrel might need to be more concentric than the uphole end of the gauge mandrel, for example if a tool desiring concentricity (e.g., a wellbore stabilizer, wellbore anchor, etc.) is located directly there below.

Referring to FIG. 1, depicted is a perspective view of a well system 100 including an exemplary operating environment that the apparatuses, systems and methods disclosed herein may be employed. For example, the well system 100 could use a gauge mandrel and/or gauge sensor according to any of the embodiments, aspects, applications, variations, designs, etc. disclosed in the following paragraphs. The well system 100, in the illustrated embodiment, includes a wellbore 110 having a wellhead 115 at a surface 120 thereof. The wellbore 110 extends and penetrates various earth strata, including in certain embodiments hydrocarbon containing subterranean formations.

A casing 125 can be cemented along a length of the wellbore 110. Nevertheless, in certain other embodiments the wellbore 110, or at least a portion thereof, is an open hole wellbore. A power source 130 can have an electrical cable 135, or multiple electrical cables, extending into the wellbore 100 and coupled with a motor 140. It should be noted that while FIG. 1 generally depicts a land-based operation, those skilled in the art will readily recognize that the principles described herein are equally applicable to subsea operations that employ floating or sea-based platforms and rigs, without departing from the scope of the disclosure. Also, even though FIG. 1 depicts a vertical wellbore, the present disclosure is equally well-suited for use in wellbores having other orientations, including horizontal wellbores, slanted wellbores, multilateral wellbores or the like.

Disposed within the wellbore 110 can be a tubing string 150 having an ESP 155 forming an electric submersible pump string. The ESP 155 may be driven by the motor 140. The tubing string 150 can also include a pump intake 160 for withdrawing fluid from the wellbore 110. The pump intake 160, or pump admission, can separate the fluid and gas from the withdrawn hydrocarbons and direct the fluid into the ESP 155. A protector 165 can be provided between the motor 140 and the pump intake 160 to prevent entrance of fluids into the motor 140 from the wellbore 110. The motor 140 can be electrically coupled with the power source 130 by the electrical cable 135. The motor 140 can be disposed below the ESP 155 within the wellbore 110, among other locations. The ESP 155 can provide artificial pressure, or lift, within the wellbore 110 to increase the withdrawal of hydrocarbons, and/or other wellbore fluids. The ESP 155 can provide energy to the fluid flow from the well thereby increasing the flow rate within the wellbore 110 toward the wellhead 115.

The tubing string 150 can be a series of tubing sections, coiled tubing, or other conveyance for providing a passageway for fluids. In at least one embodiment, a gauge mandrel 170 is interposed within the tubing string 150, the gauge mandrel 170 having a gauge sensor (not shown, but including a temperature and/or pressure sensor) disposed therein. The gauge sensor, in the disclosed embodiment, is configured to determine the temperature and/or pressure within the tubing string 150, and/or as well as within the annulus between the wellbore 110 and the gauge mandrel 170, or any combination of the foregoing. Accordingly, the gauge sensor may be coupled with sensor technology 180 via a wire 190 (e.g., TEC conductor).

The gauge mandrel 170 may include one or more of the novel features as disclosed within the present disclosure, including a primary fluid passageway located in a main section of its housing and extending along the length ($L_t$), the primary fluid passageway including an uphole tubing coupling having an uphole tubing coupling centerline ($C_{LTU}$) and a downhole tubing coupling having a downhole tubing coupling centerline ($C_{LTD}$), and further wherein the uphole tubing coupling centerline ($C_{LTU}$) and the downhole tubing coupling centerline ($C_{LTD}$) are offset from one another by a distance ($D_T$). In accordance with this embodiment, the change in centerline creates a tortuous path for the fluid to travel as it traverses the gauge mandrel, in effect creating a turbulent flow in the gauge mandrel that continuously replaces the fluid in and around the gauge sensor. Thus, the tortuous path helps improve the correlation between the gauge sensor readings and the fluid properties. Moreover, the design of the internal profile of the gauge mandrel may be manipulated to increase or decrease the amount of flow turbulence.

The gauge sensor located within the gauge mandrel 170 may include one or more of the novel features as disclosed within the present disclosure, including: a sensor region, the sensor region including one or more pressure sensors or temperature sensors contained therein; a first tubing encapsulated conductor (TEC) termination region coupled to an uphole end of the sensor region, the first TEC termination region including a first TEC termination having a first TEC centerline ($C_{LS1}$); and a second tubing encapsulated conductor (TEC) termination region coupled to a downhole end of the sensor region, the second TEC termination region including a second TEC termination having a second TEC centerline ($C_{LS2}$), and further wherein the first TEC centerline ($C_{LS1}$) and the second TEC centerline ($C_{LS2}$) are offset from one another by a distance ($D_S$).

Figure 2A:
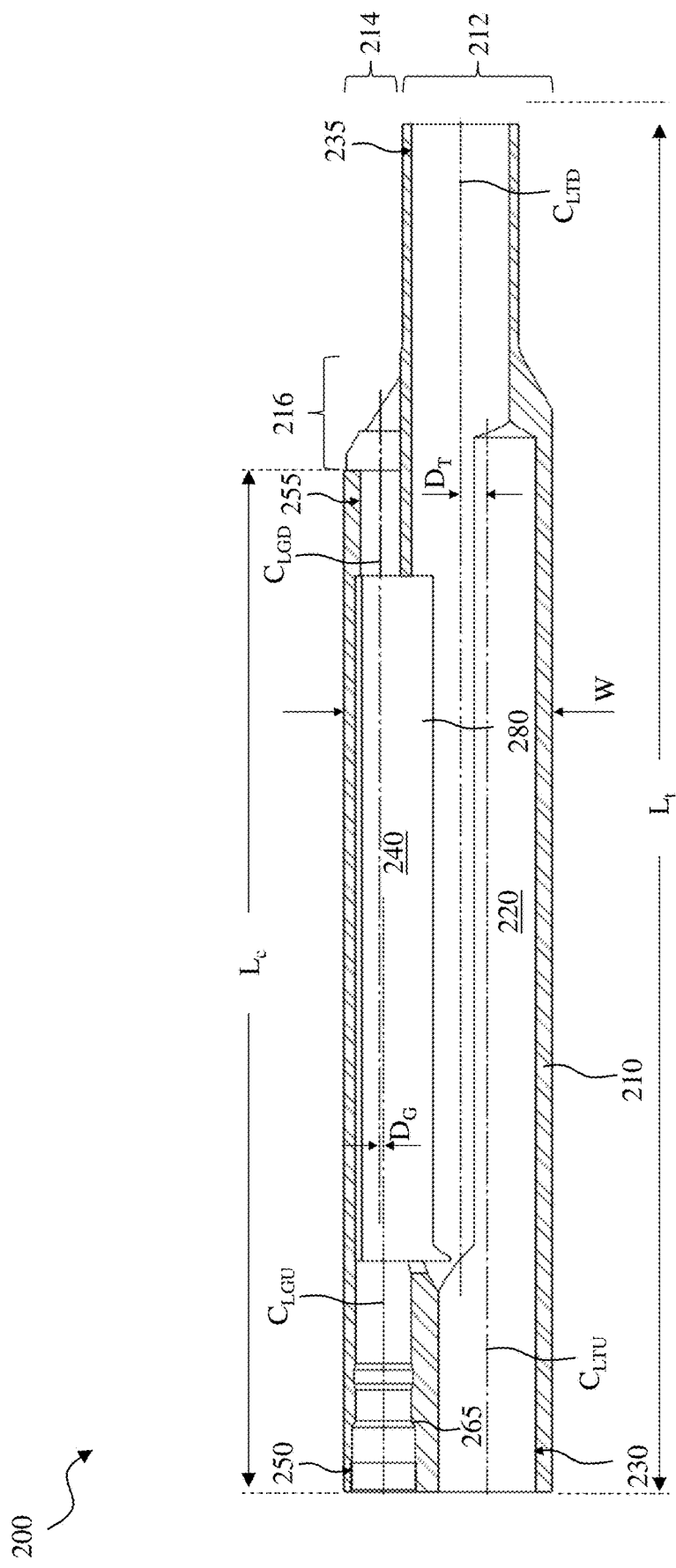
FIGS. 2A and 2B illustrate a cross-sectional view and top view, respectively, of one embodiment of a gauge mandrel designed, manufactured and/or operated according to one or more embodiments of the disclosure.
Figure 2B:
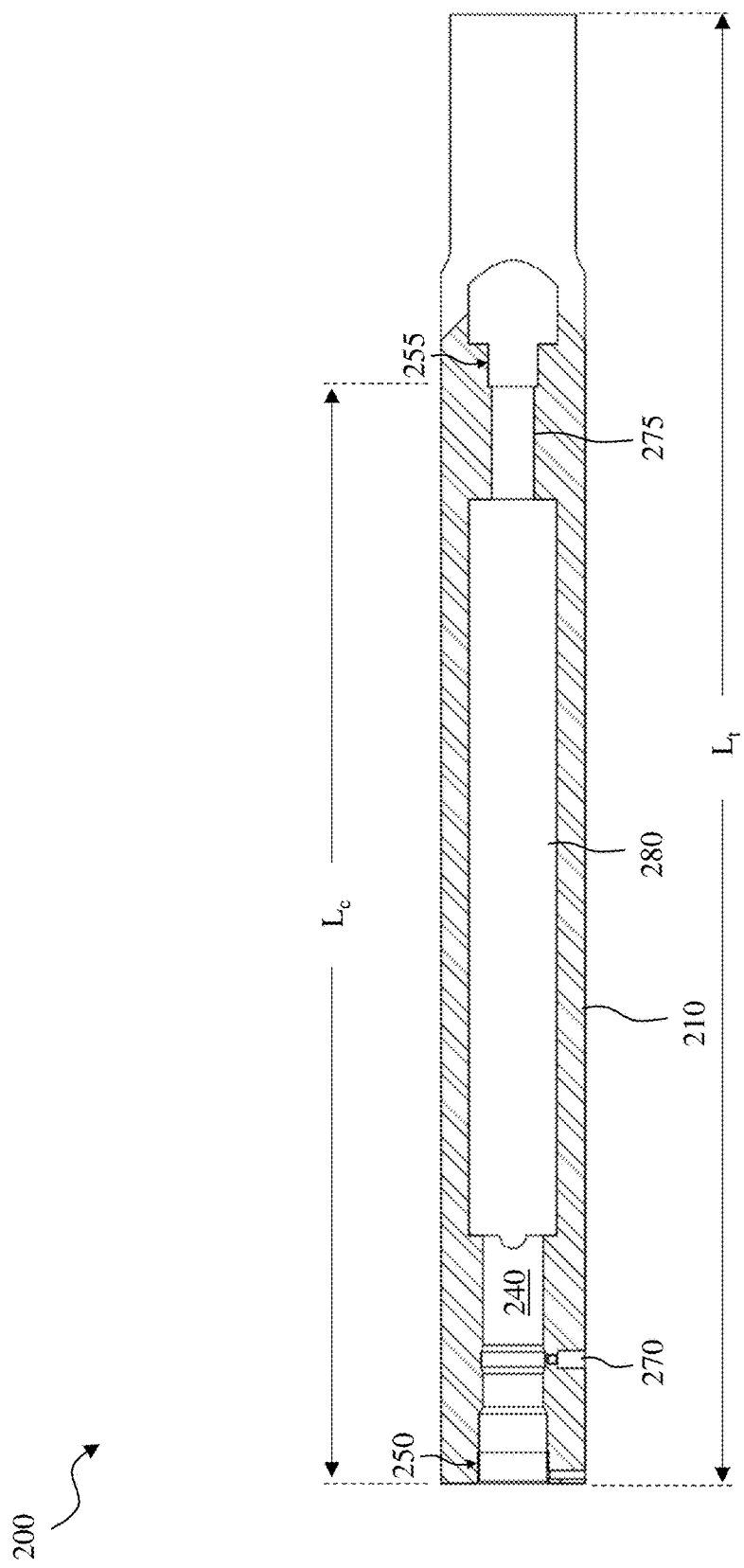

Turning to FIGS. 2A and 2B, illustrated are a cross-sectional view and top view, respectively, of one embodiment of a gauge mandrel 200 designed, manufactured and/or operated according to one or more embodiments of the disclosure. The gauge mandrel 200, in the illustrated embodiment, includes a housing 210. In at least one embodiment, the housing 210 has a length ($L_t$) and a width (W). The length ($L_t$) may vary greatly and remain within the scope of the disclosure. Nevertheless, in at least one embodiment the length ($L_t$) ranges from 45 cm to 125 cm, and in yet another embodiment the length ($L_t$) ranges from 60 cm to 90 cm. In one or more embodiments, the width (W) is an external diameter ($D_e$), as opposed to a flat or shaved surface, such as shown in FIGS. 2A and 2B. Further to the embodiment of FIGS. 2A and 2B, the housing 210 includes a main section 212 and an upset section 214 extending outward from the main section 212. In at least one embodiment, the upset section 214 creates a clearance 216 for a gauge sensor pressure fitting.

The gauge mandrel 200, in accordance with one or more embodiments, may additionally include a primary fluid passageway 220 located in the main section 212 of the housing and extending along the length ($L_t$). In accordance with one embodiment of the disclosure, the primary fluid passageway 220 includes an uphole tubing coupling 230 having an uphole tubing coupling centerline ($C_{LTU}$), and a downhole tubing coupling 235 having a downhole tubing coupling centerline ($C_{LTD}$). In one or more embodiments, the uphole tubing coupling centerline ($C_{LTU}$) and the downhole tubing coupling centerline ($C_{LTD}$) are offset from one another by a distance ($D_T$). In at least one embodiment, the distance ($D_T$) is at least 1 mm. In at least one other embodiment, the distance ($D_T$) is at least 12 mm, and in yet another embodiment the distance ($D_T$) ranges from 0.5 mm to 30 mm. Furthermore, in at least one embodiment, the downhole tubing coupling centerline ($C_{LTD}$) is closer to a top of the upset section 214 than the uphole tubing coupling centerline ($C_{LTU}$) is to the top of the upset section 214.

As discussed above, the offset may allow one end of the gauge mandrel 200 to be more concentric than the other end of the gauge mandrel 200. For instance, in the embodiment of FIGS. 2A and 2B, a downhole end of the gauge mandrel 200 is more concentric than an uphole end of the gauge mandrel 200. Nevertheless, other embodiments may exist wherein the opposite is true.

The gauge mandrel 200, in accordance with one or more embodiments, may additionally include a gauge cavity 240 extending along at least a portion of the length ($L_t$) of the housing 210. The gauge cavity 240 in the illustrated embodiment is located entirely within the upset section 214 of the housing 210 and has a gauge cavity length ($L_c$). This is as opposed to a slot, that would be exposed to an outside of the gauge mandrel along at least a portion of the length ($L_t$) of the housing 210. The length ($L_c$) may vary greatly and remain within the scope of the disclosure. Nevertheless, in at least one embodiment the length ($L_c$) ranges from 35 cm to 95 cm, and in yet another embodiment the length ($L_c$) ranges from 55 cm to 75 cm. In the illustrated embodiment, the length ($L_c$) of the gauge cavity 240 is less than the length ($L_t$) of the housing 210. For example, in at least one embodiment the length ($L_c$) of the gauge cavity 240 is at least 10 percent less than the length ($L_t$) of the housing 210. In yet another embodiment, the length ($L_c$) of the gauge cavity 240 is at least 20 percent less, if not at least 30 percent less, than the length ($L_t$) of the housing 210.

In one or more embodiments, the gauge cavity 240 includes an uphole gauge coupling 250 and a downhole gauge coupling 255. In at least one embodiment, the uphole gauge coupling 250 has an uphole gauge coupling centerline ($C_{LGU}$) and the downhole gauge coupling 255 has a downhole gauge coupling centerline ($C_{LGD}$). Further to one or more embodiments, the uphole gauge coupling centerline ($C_{LGU}$) and the downhole gauge coupling centerline ($C_{LGD}$) are offset from one another by a distance ($D_G$). In at least one embodiment, the distance ($D_G$) is at least 0.5 mm. In at least one other embodiment, the distance ($D_G$) is at least 1 mm, and in yet another embodiment the distance ($D_G$) ranges from 0.3 mm to 10 mm. Furthermore, in at least one embodiment, the downhole gauge coupling centerline ($C_{LGD}$) is closer to a top of the upset section 214 than the uphole gauge coupling centerline ($C_{LGU}$) is to the top of the upset section 214.

In at least one embodiment, the uphole gauge coupling 250 includes one or more threads for accepting a gland (not shown) therein. For example, the gland could have associated threads that mate with the one or more threads of the uphole gauge coupling 250 to hold a related gauge sensor within the gauge cavity 240. While the one or more threads are discussed with regard to FIGS. 2A and 2B as the coupling feature, those skilled in the art understand that other coupling features (e.g., a press fit feature, a set screw, etc.) could be used to hold the related gauge sensor within the gauge cavity 240.

The gauge cavity 240, in at least the embodiment shown, includes a gauge mandrel angled surface 265 proximate the uphole gauge coupling 250. In at least another embodiment, the gauge mandrel angled surface 265 is substantially proximate the uphole gauge coupling 250. The term proximate, as used with regard to the placement of the gauge mandrel angled surface 265, means within the first 20 percent of the gauge cavity 240. The term substantially proximate, as used with regard to the placement of the gauge mandrel angled surface 265, means within the first 10 percent of the gauge cavity 240. The gauge mandrel angled surface 265 may couple with a gauge sensor angled surface of the gauge sensor that it accepts. Accordingly, the coupling of the gauge mandrel angled surface 265 and the gauge sensor angled surface transfers any stresses from the gauge sensor to the gauge mandrel 200 away from a sensor region of the gauge sensor. Thus, the coupling of the gauge sensor with the gauge mandrel 200 should not impact the accuracy of the gauge sensor. In at least one embodiment, an angle of the gauge mandrel angled surface 265 is slightly mismatched with an angle of the gauge angled surface. For example, in at least one embodiment, the two angles are mismatched by 2 degrees or more, if not 5 degrees or more. As discussed above, the coupling of the gauge sensor with the gauge mandrel 200 may provide a metal to metal seal.

In certain other embodiments, the gauge cavity 240 may have a pressure test port 270 coupling an exterior of the gauge mandrel 200 to the gauge cavity 240, as shown in FIG. 2B. This pressure test port 270, when employed, may be used to pressure test the gauge cavity 240 and all of the associated connections and fittings thereof when the gauge sensor is positioned therein. The gauge cavity 240 may additionally include a second seal profile 275. The second seal profile 275, in at least one embodiment, may be configured to engage with a pressure fitting used to create a seal with a downhole end of the gauge sensor.

In accordance with one embodiment of the disclosure, the gauge mandrel 200 may additionally include one or more fluid passageways 280 coupling the primary fluid passageway 220 and the gauge cavity 240. In the illustrated embodiment of FIGS. 2A and 2B, the gauge mandrel 200 employs a single fluid slot as its fluid passageway 220 to couple the primary fluid passageway with the gauge cavity 240. The single fluid slot allows the fluid from the primary fluid passageways 220 of the housing 210 to enter and exit the gauge cavity 240 with greater regularity than might be possible with one or more smaller fluid ports. In at least one embodiment, the single fluid slot has a length ($L_s$) of at least 14 cm. In at least one other embodiment, the single fluid slot has a greater length ($L_s$) of at least 65 cm. In yet another embodiment (not shown), the gauge mandrel 200 may include at least two or three fluid ports, as its fluid passageway 220, if not at least six fluid ports.

Figure 3A:
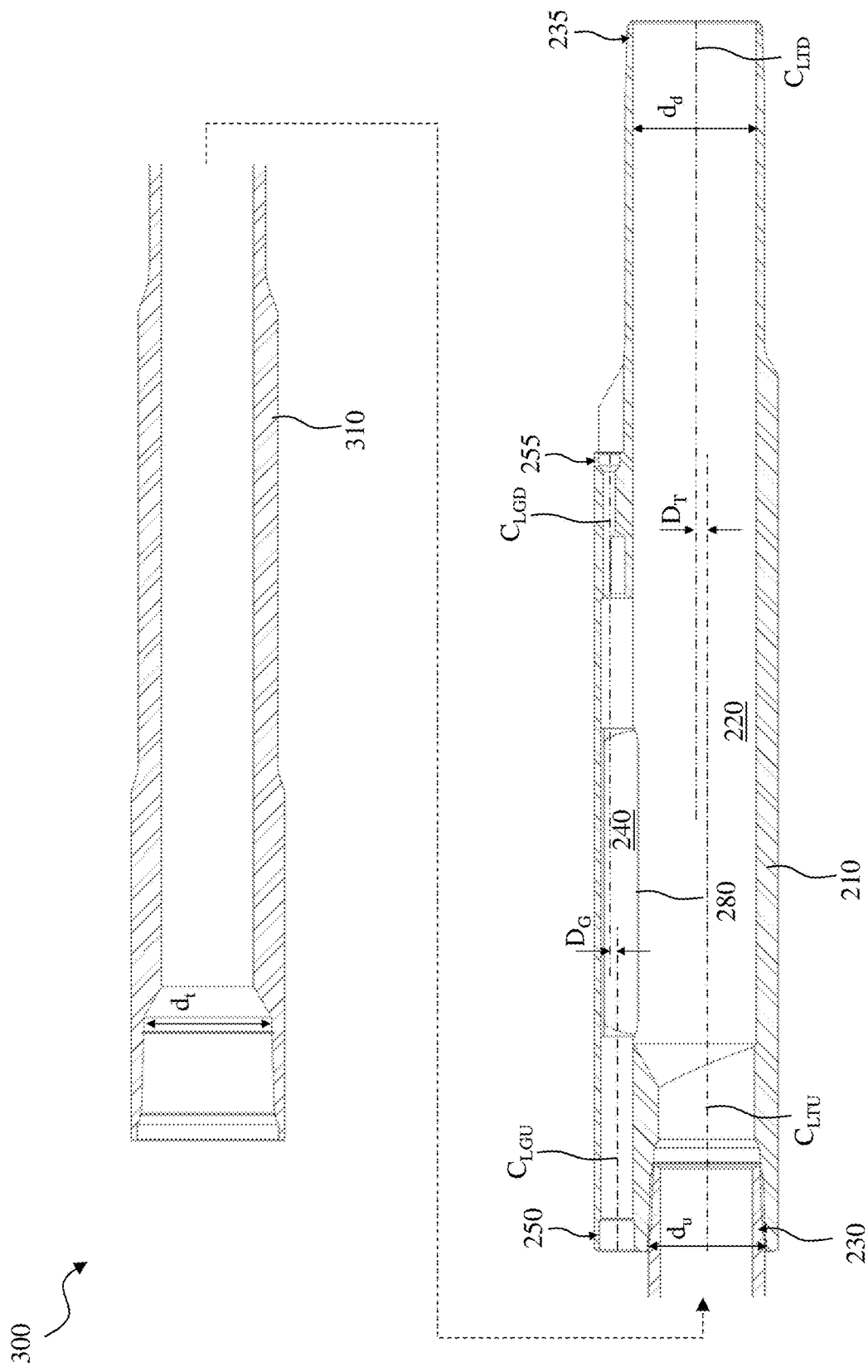
FIGS. 3A and 3B illustrate a cross-sectional view and top view, respectively, of one embodiment of a gauge mandrel designed, manufactured and/or operated according to one or more alternative embodiments of the disclosure.
Figure 3B:
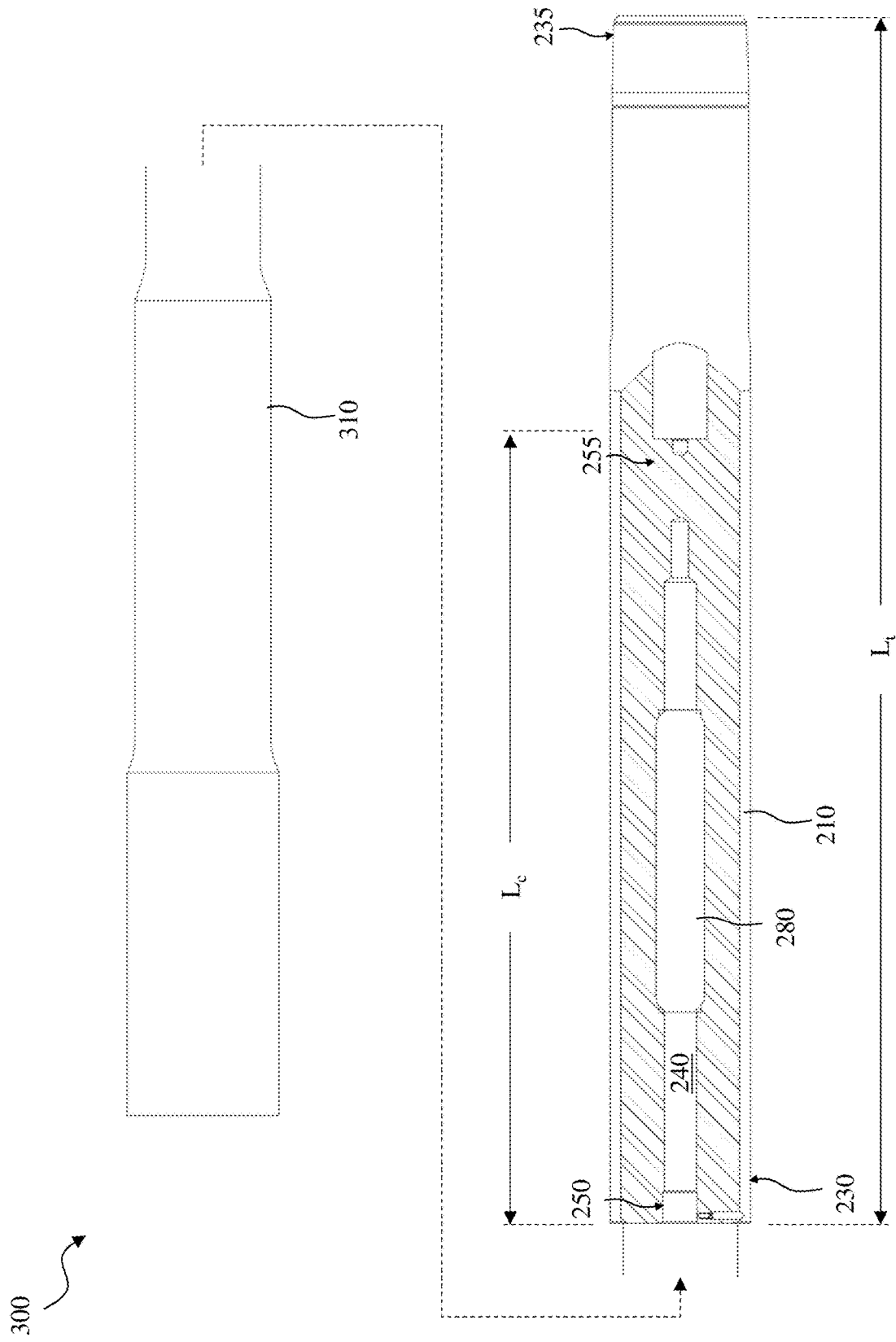

Turning to FIGS. 3A and 3B, illustrated are a cross-sectional view and top view, respectively, of one embodiment of a gauge mandrel 300 designed, manufactured and/or operated according to one or more alternative embodiments of the disclosure. The gauge mandrel 300 is similar in many respects to the gauge mandrel 200 of FIGS. 2A and 2B. Accordingly, like reference numbers have been used to illustrate similar, if not identical, features. The gauge mandrel 300 differs, for the most part, from the gauge mandrel 200, in that an internal diameter ($d_u$) of the uphole tubing coupling 230 is less than an internal diameter ($d_d$) of the downhole tubing coupling 235. In doing this, the downhole tubing coupling 235 may be even more concentric (e.g., relatively) than the uphole tubing coupling 230.

Further to the embodiment of FIGS. 3A and 3B, a crossover sub 310 may be attached to the uphole tubing coupling 230. The crossover sub 310 may be used to increase the internal diameter ($d_u$) of the uphole tubing coupling 230 to an internal diameter ($d_r$) of the crossover sub 310 (e.g., which may be somewhat similar to the internal diameter ($d_d$) of the downhole tubing coupling 235).

Figure 4A:
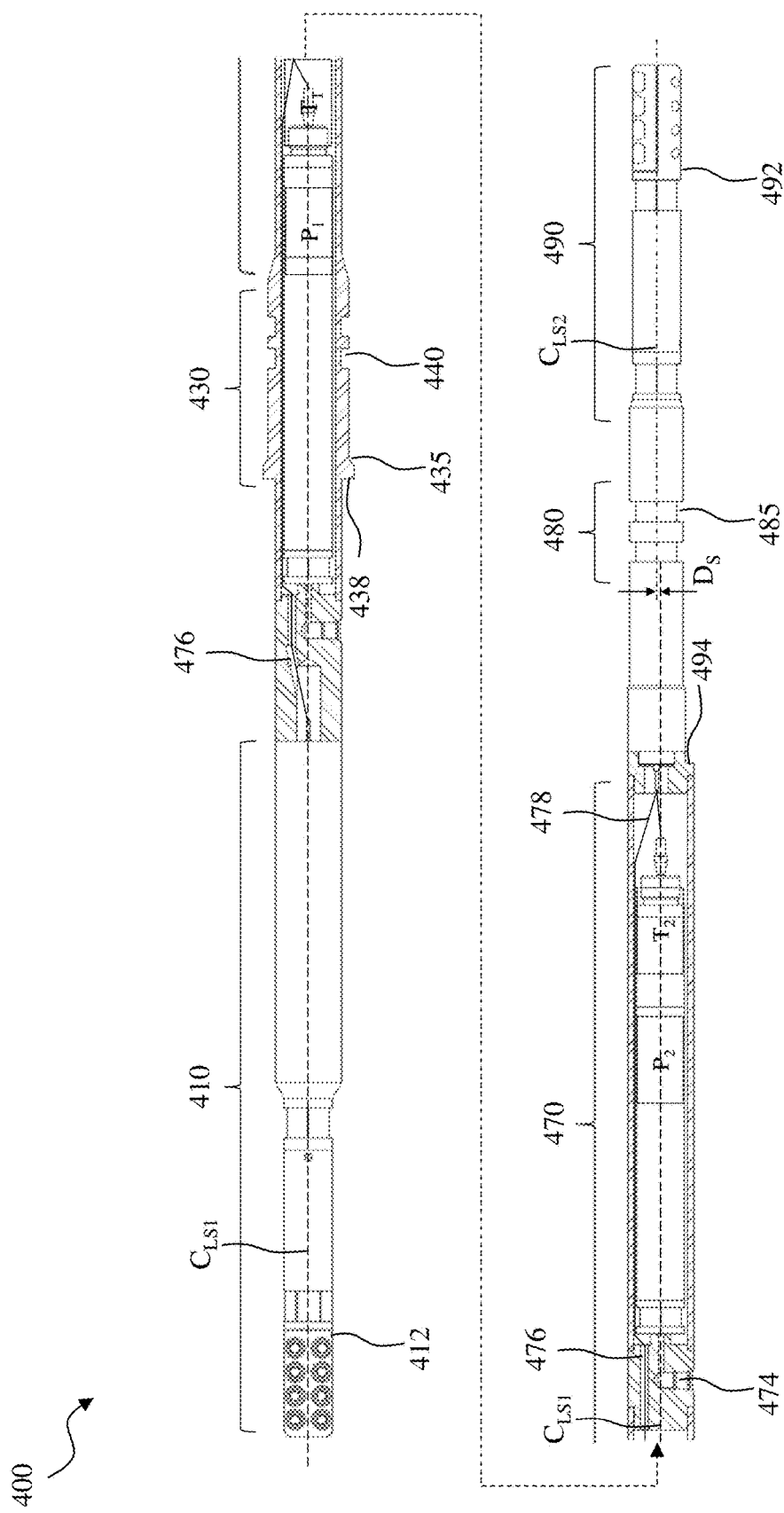
FIGS. 4A and 4B illustrate a cross-sectional view and top view, respectively, of one embodiment of a gauge sensor designed, manufactured and/or operated according to one or more embodiments of the disclosure.
Figure 4B:
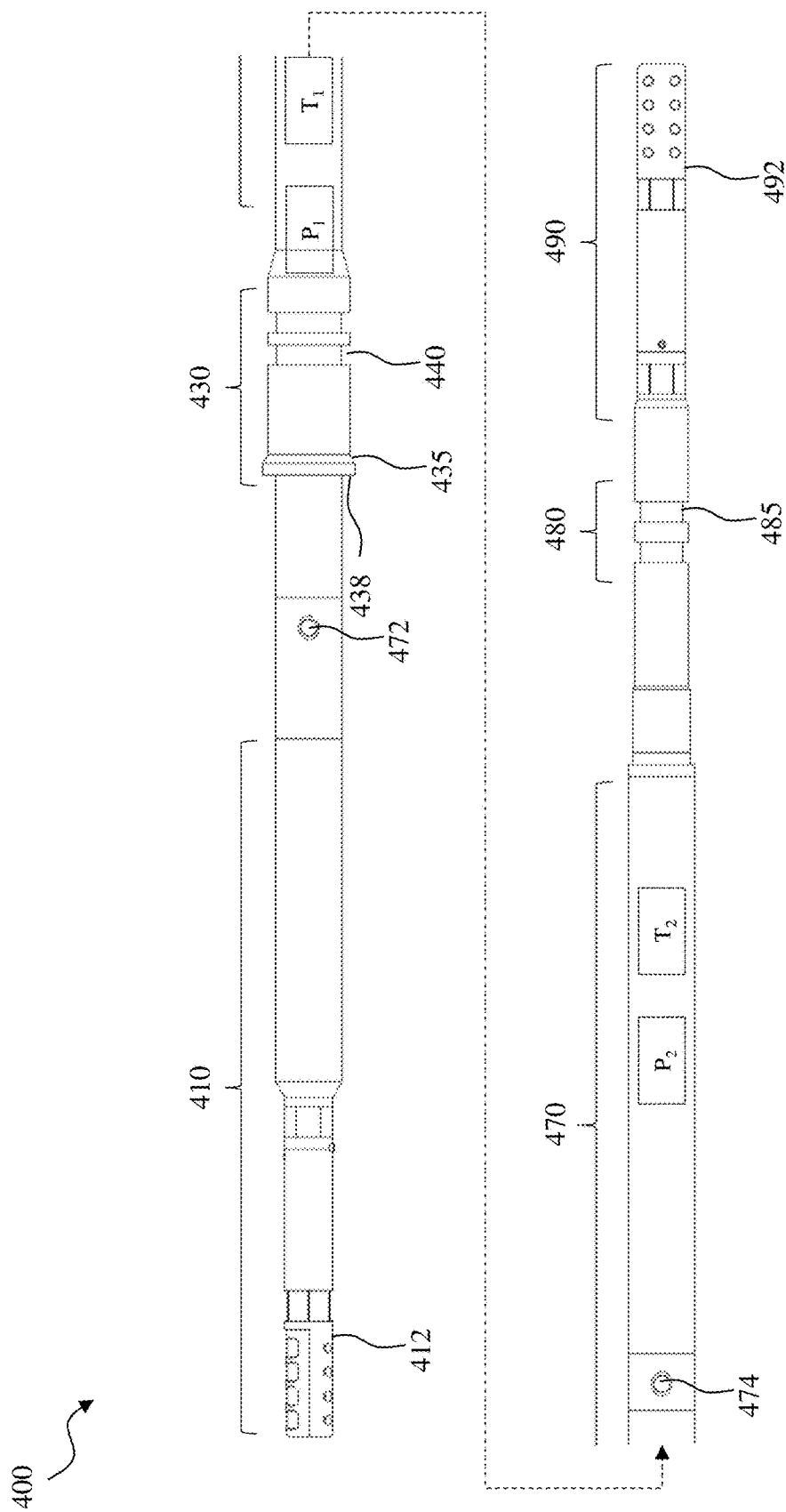

Turning to FIGS. 4A and 4B, illustrated are a cross-sectional view and top view, respectively, of one embodiment of a gauge sensor 400 designed, manufactured and/or operated according to one or more embodiments of the disclosure. The gauge sensor 400, in at least one embodiment, might be used with one or more of the gauge mandrels discussed above, among other uses. In the illustrated embodiment, the gauge sensor 400 may be divided into a plurality of different regions, for example including a first tubing encapsulated conductor (TEC) termination region 410, a first seal region 430, a sensor region 470, a second seal region 480, and a second tubing encapsulated conductor (TEC) termination region 490.

In one or more embodiments, the first TEC termination region 410 includes a first TEC termination 412, and the second TEC termination region 490 includes a second TEC termination 492. The first TEC termination 412 and the second TEC termination 492, as those skilled in the art would expect, are configured to provide a termination point with an incoming TEC and outgoing TEC and the gauge sensor 400. Nevertheless, any termination may be used and remain within the scope of the disclosure.

In one or more embodiments, the first TEC termination region 410 includes a first TEC centerline ($C_{LS1}$), and the second TEC termination region 490 includes a second TEC centerline ($C_{LS2}$). In at least one embodiment, the first TEC centerline ($C_{LS1}$) and the second TEC centerline ($C_{LS2}$) are offset from one another by a distance ($D_S$), for example as created by the step-up 494. For example, in one embodiment the distance ($D_S$) is at least 0.5 mm. In yet another embodiment, the distance ($D_S$) is at least 1 mm, and in yet another embodiment the distance ($D_S$) ranges from 0.3 mm to 10 mm.

The first seal region 430, in at least one embodiment, includes a gauge sensor angled surface 435. As discussed above, the gauge sensor angled surface 435 is configured to couple with a gauge mandrel angled surface (e.g., gauge mandrel angled surface 265) of the gauge mandrel that the gauge sensor is configured to insert within. In at least one embodiment, the gauge sensor angled surface 435 couples with the gauge mandrel angled surface to form a metal to metal seal. The gauge sensor angled surface 435 additionally provides a face 438 that a gland (not shown) may be torqued against to energize the metal to metal seal.

The first seal region 430 may additionally include one or more seal grooves 440. The one or more seal grooves 440, which in the embodiment shown in FIG. 4A are a pair of seal grooves 440, are configured to engage with and position one or more seals (e.g., one or more O-ring seals). Accordingly, the one or more seal grooves 440 may hold the one or more seals in place as the gauge sensor 400 is being positioned within a gauge cavity of an associated gauge mandrel. In this embodiment, the one or more seals would engage with the gauge cavity in the gauge mandrel to provide another seal (e.g., secondary seal).

The gauge sensor angled surface 435 and the one or more seal grooves 440 enable pressure testing of the assembled tool in the field. In this illustration the seal grooves are O-ring seal grooves, however this can be updated as required for higher temperature rated seals if a secondary seal is required. In at least one embodiment, a spacing (s) between the gauge sensor angled surface 435 and the one or more seal grooves 440 ranges from 6 cm to 20 cm. In yet another embodiment, the spacing (s) between the gauge sensor angled surface 435 and the one or more seal grooves 440 ranges from 8 cm to 10 cm.

The sensor region 470, in at least one embodiment, includes one or more pressure sensors (P) or temperature sensors (T) contained therein. For example, the sensor region 470 could include a first pressure sensor ($P_1$) and a first temperature sensor ($T_1$) configured to measure a first fluid pressure and first fluid temperature, respectfully, outside of a mandrel that the gauge sensor 400 is located, and a second pressure sensor ($P_2$) and a second temperature sensor ($T_2$) configured to measure a second fluid pressure and second fluid temperature, respectfully, inside a mandrel that the gauge sensor is located. In at least one embodiment, the sensor region 470 includes a first port 472 coupling the first pressure sensor ($P_1$) and first temperature sensor ($T_1$) and the outside of the mandrel, and a second port 474 coupling the second pressure sensor ($P_2$) and second temperature sensor ($T_2$) and the inside of the mandrel (e.g., inside of the primary fluid passageway). In at least one embodiment, the sensor region 470 is spaced apart from the first seal region 430, such that the coupling of the gauge sensor 400 within the gauge mandrel does not impact the accuracy of the gauge sensor 400.

The sensor region 470, in at least one embodiment, may additionally include one or more internal wire passages 476 therein. In at least one embodiment, the one or more internal wire passages 476 couple the first TEC termination region 410 and the second TEC termination region 490. Moreover, other regions of the gauge sensor 400 may include the one or more internal wire passages 476, including one or more portions of the first TEC termination region 410, the first seal region 430, the second seal region 480, and the second TEC termination region 490. In the illustrated embodiment, a conductor 478 extends through the one or more internal wire passages 476 between the first TEC termination region 410 and the second TEC termination region 490. For example, while not all of it is shown, in the illustrated embodiment the conductor 478 extends from the TEC termination 412, "bypassing" the first pressure sensor ($P_1$) and first temperature sensor ($T_1$), splitting to connect to the "pin" on the right end of the first pressure sensor ($P_1$) and first temperature sensor ($T_1$), and then proceeding through the small passage "above" the second port 474, "bypassing" the second pressure sensor ($P_2$) and second temperature sensor ($T_2$), and splitting to connect the "pin" on the right end of the second pressure sensor ($P_2$) and second temperature sensor ($T_2$) and the "pin" on the second TEC termination 492.

The second seal region 480, in at least one embodiment, includes one or more seal grooves 485. The one or more seal grooves 485, which in the embodiment shown in FIGS. 4A and 4B are a pair of seal grooves 485, are configured to engage with and position one or more seals (e.g., one or more O-ring seals). Accordingly, the one or more seal grooves 485 may hold the one or more seals in place as the gauge sensor 400 is being positioned within a gauge cavity of an associated gauge mandrel.

Figure 5A:
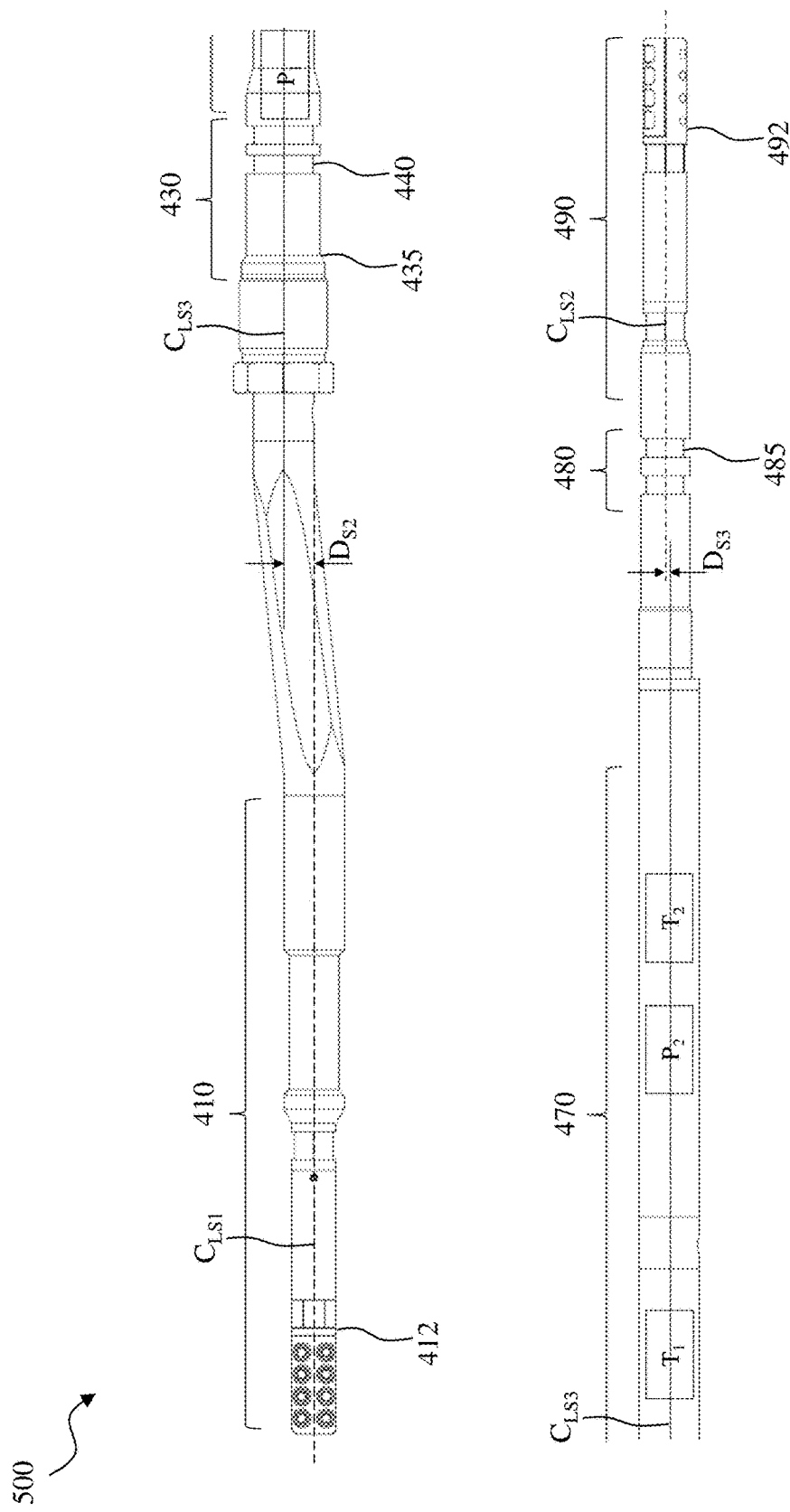
FIGS. 5A and 5B illustrate a cross-sectional view and top view, respectively, of one embodiment of a gauge sensor designed, manufactured and/or operated according to one or more alternative embodiments of the disclosure.
Figure 5B:
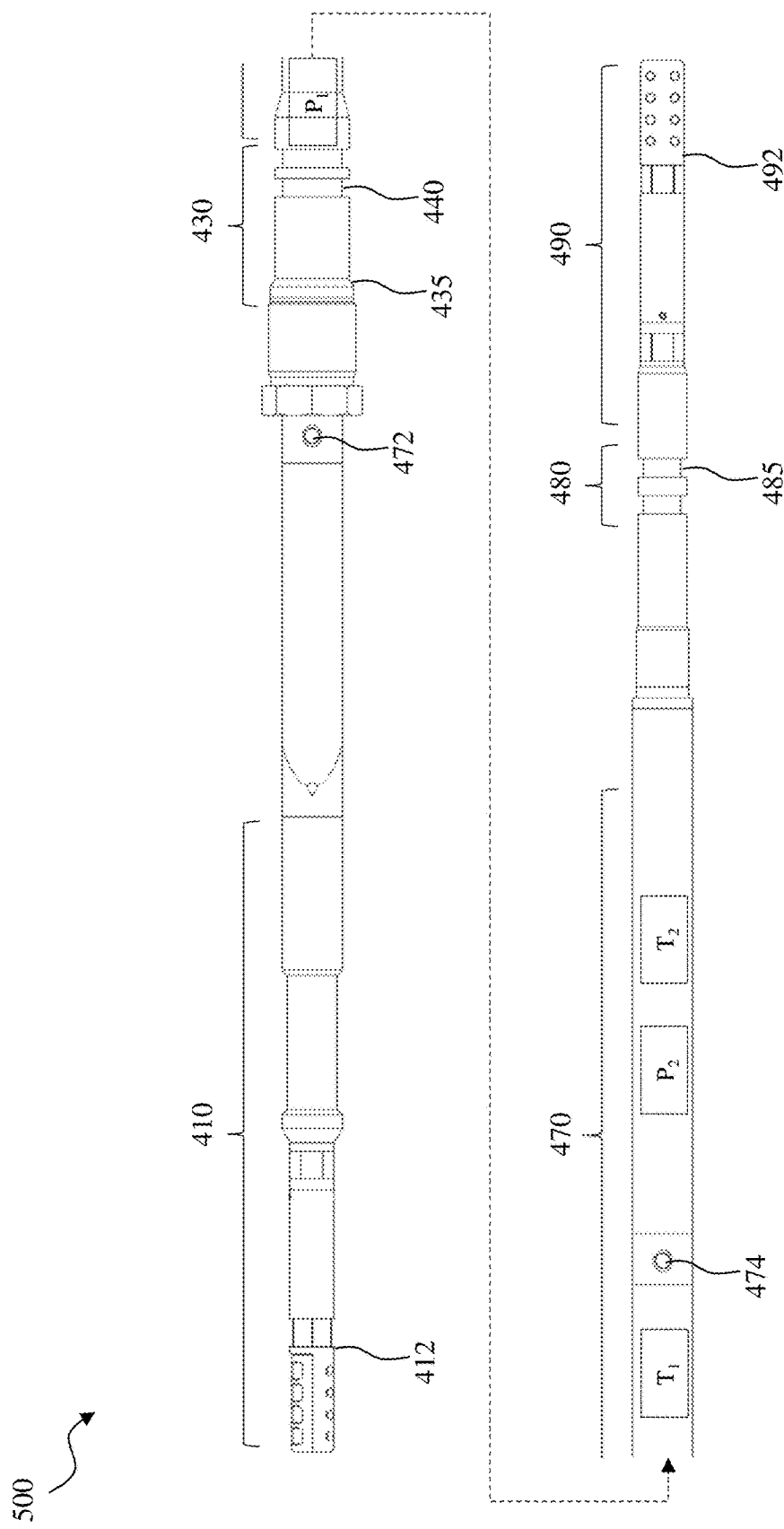

Turning to FIGS. 5A and 5B, illustrated are a cross-sectional view and top view, respectively, of an alternative embodiment of a gauge sensor 500 designed, manufactured and/or operated according to one or more embodiments of the disclosure. The gauge sensor 500 is similar in many respects to the gauge sensor 400 of FIGS. 4A and 4B. Accordingly, like reference numbers have been used to indicate similar, if not identical, features. The gauge sensor 500 differs, for the most part, from the gauge sensor 400, in that the gauge sensor 500 has a sensor region centerline ($C_{LS3}$) that is offset from the first TEC centerline ($C_{LS1}$) by a distance ($D_{S2}$) and the second TEC centerline ($C_{LS2}$) by a distance ($D_{S3}$). In the illustrated embodiment, the distance ($D_S$) that the first TEC centerline ($C_{LS1}$) and the second TEC centerline ($C_{LS2}$) are offset from one another is a summation of the distance ($D_{S2}$) and the distance ($D_{S3}$).

Figure 6A:
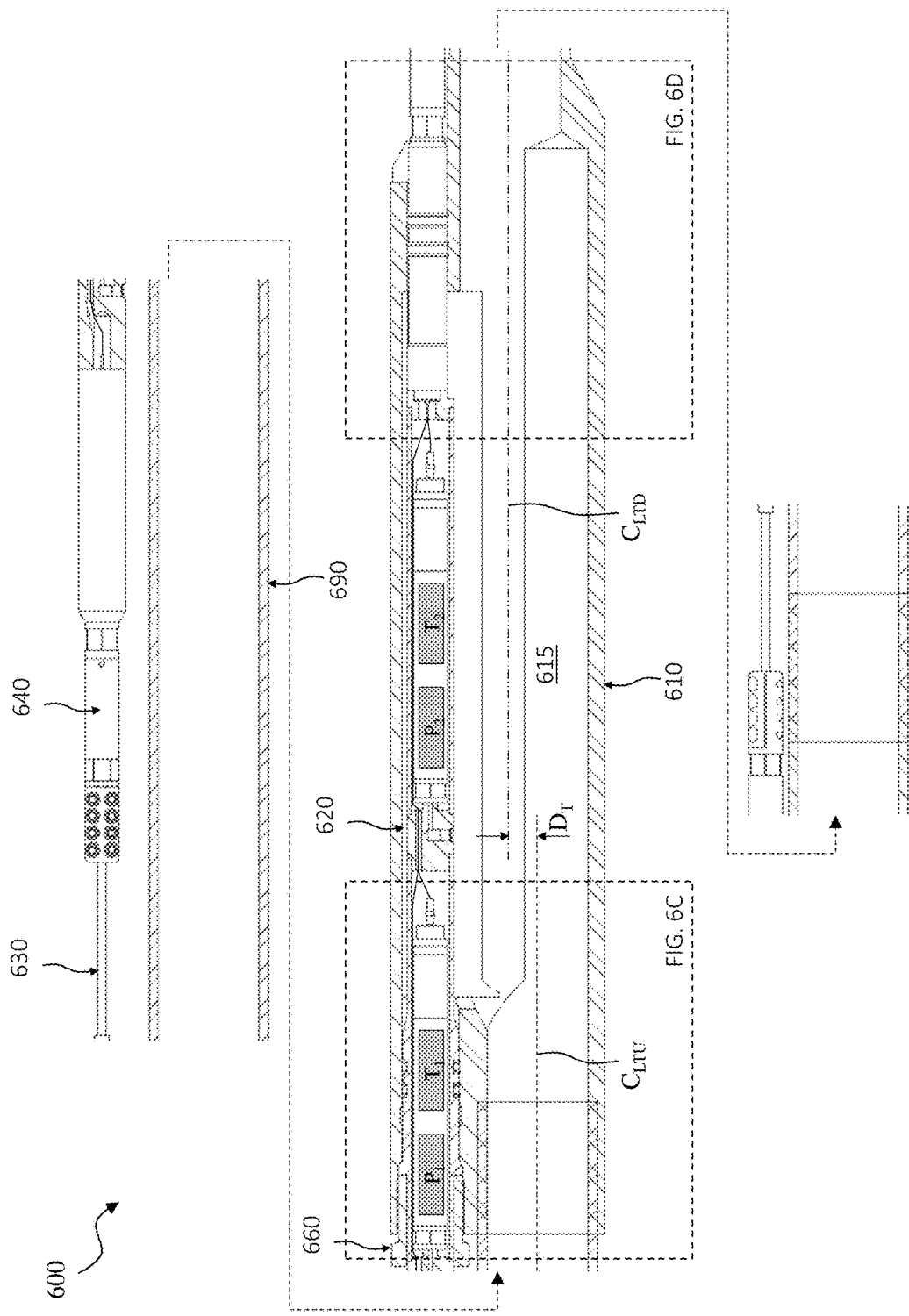
Figure 6B:
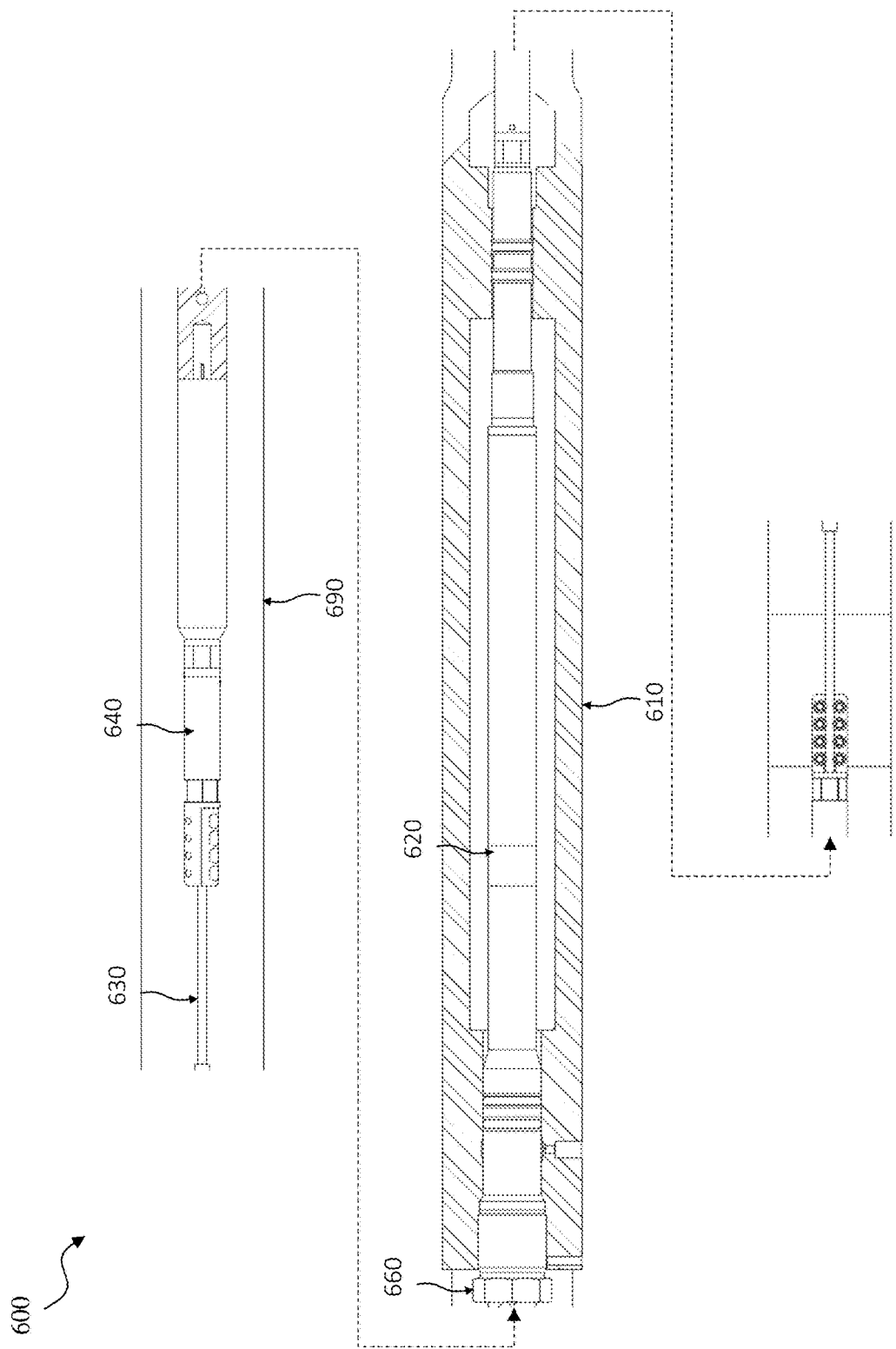

Turning to FIGS. 6A and 6B, illustrated are a cross-sectional view and top view, respectively, of a sensing system 600 (e.g., installed sensing system) according to any of the embodiments, aspects, applications, variations, designs, etc. disclosed herein. In at least one embodiment, the sensing system 600 is located in a wellbore and fluidly coupled to production tubing proximate a submersible pump. In yet another embodiment, the sensing system 600 is located in a wellbore and fluidly coupled to production tubing substantially proximate a submersible pump. The term proximate, as used with regard to the placement of the sensing system 600 relative to the submersible pump, means the sensing system 600 is positioned within 20 meters of the submersible pump. The term proximate, as used with regard to the placement of the sensing system 600 relative to the submersible pump, means the sensing system 600 is positioned within 4 meters of the submersible pump.

The sensing system 600 of the embodiment of FIGS. 6A and 6B includes a gauge mandrel 610 having a primary fluid passageway 615, the gauge mandrel 610 being coupled to tubing 690 (e.g., production tubing). The sensing system 600 of the embodiment of FIGS. 6A and 6B additionally includes a gauge sensor 640 located within a gauge cavity 620. In the illustrated embodiment, the gauge mandrel 610 has an upset section, such that the primary fluid passageway 615 within the gauge mandrel 610 is not concentric with an exterior of the gauge mandrel 610 in the upset section.

The sensing system 600 of the embodiment of FIGS. 6A and 6B may additionally include a first pressure fitting 660 sealing one end of the gauge sensor 640 within the gauge cavity 620 (e.g., an uphole pressure fitting such as the illustrated seal gland). The first pressure fitting 660, at least in one embodiment, does not place the gauge sensor 640 under compressive or tensile loading, thereby eliminating the potential for these loads to distort the internal features of the gauge sensor 640, which could compromise the measurement accuracy. The sensing system 600 of the embodiment of FIGS. 6A and 6B may further include one or more conductors 630 coupled with the gauge sensor 640. In at least one embodiment, the one or more conductors 630 are TEC conductors. As those skilled in the art may appreciate, the gauge mandrel 610 and the gauge sensor 640, as well as their features, may be similar to the gauge mandrel(s) and gauge sensor(s) discussed above, and particularly related to FIGS. 2A, 2B, 4A and 4B.

Turning to FIG. 6C, illustrated is a zoomed in cross-sectional view of a portion of the sensing system 600 (e.g., installed sensing system) of FIG. 6A according to any of the embodiments, aspects, applications, variations, designs, etc. disclosed herein. As is evident in the embodiment of FIG. 6C, the uphole tubing coupling centerline ($C_{LTD}$) and the downhole tubing coupling centerline ($C_{LTD}$) are offset from one another by a distance ($D_T$).

With continued reference to FIG. 6C, the gauge sensor 640 may include a gauge angled surface 645 that couples with the gauge mandrel angled surface 635 of the gauge mandrel 610, thereby forming a metal to metal seal. As is further evident in the embodiment of FIG. 6C, the gauge sensor 640 may include one or more seal grooves 650 and one or more seals 655, the one or more seal grooves 650 and one or more seals 655 providing a secondary seal for the metal to metal seal. The one or more seal grooves 650 and the one or more seals 655 may additionally create a chamber with the metal to metal seal created by the gauge angled surface 645 and the gauge mandrel angled surface 635, which may be used to test the metal to metal seal.

Figure 6D:
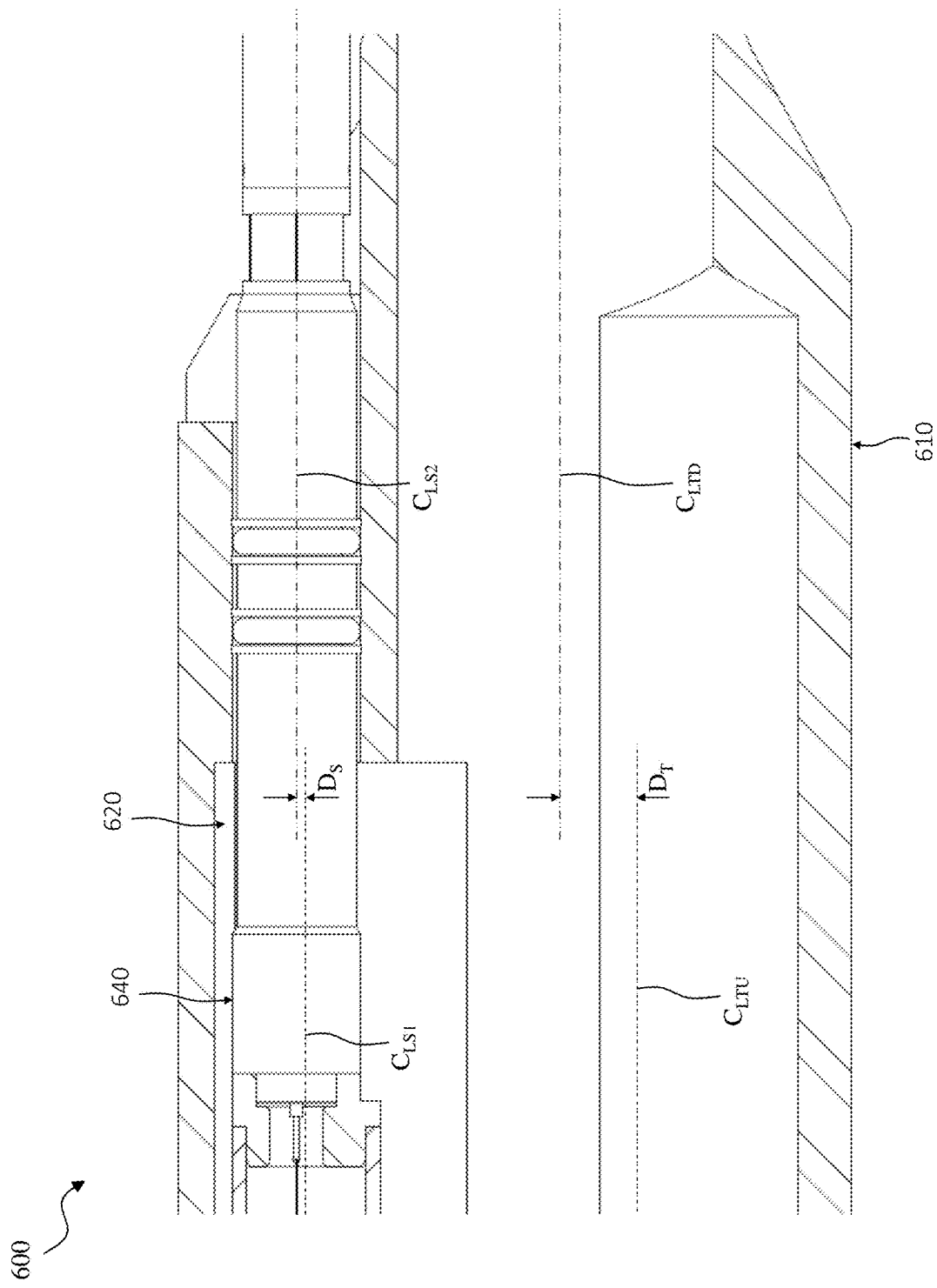
Figure 7B:
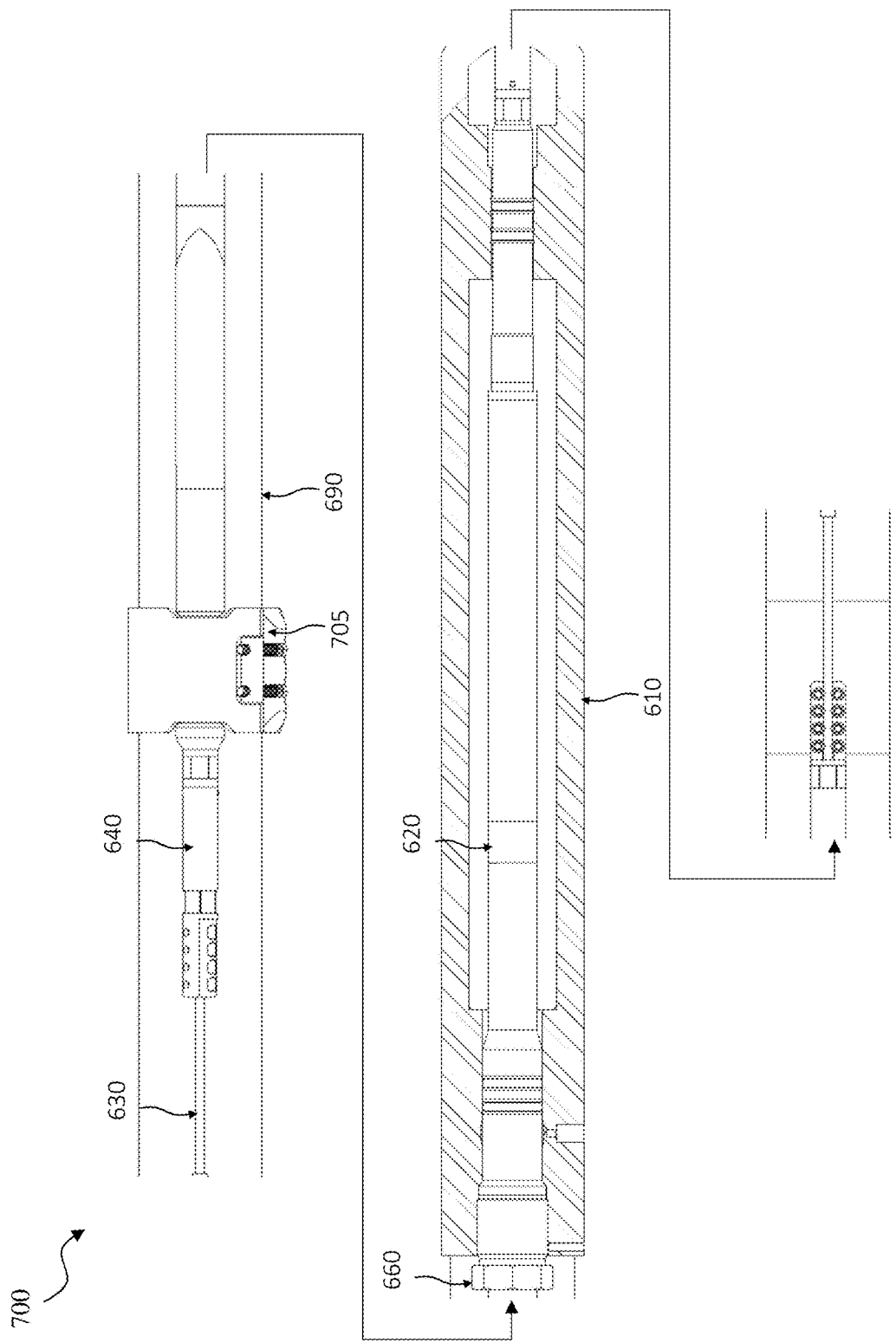
Figure 7C:
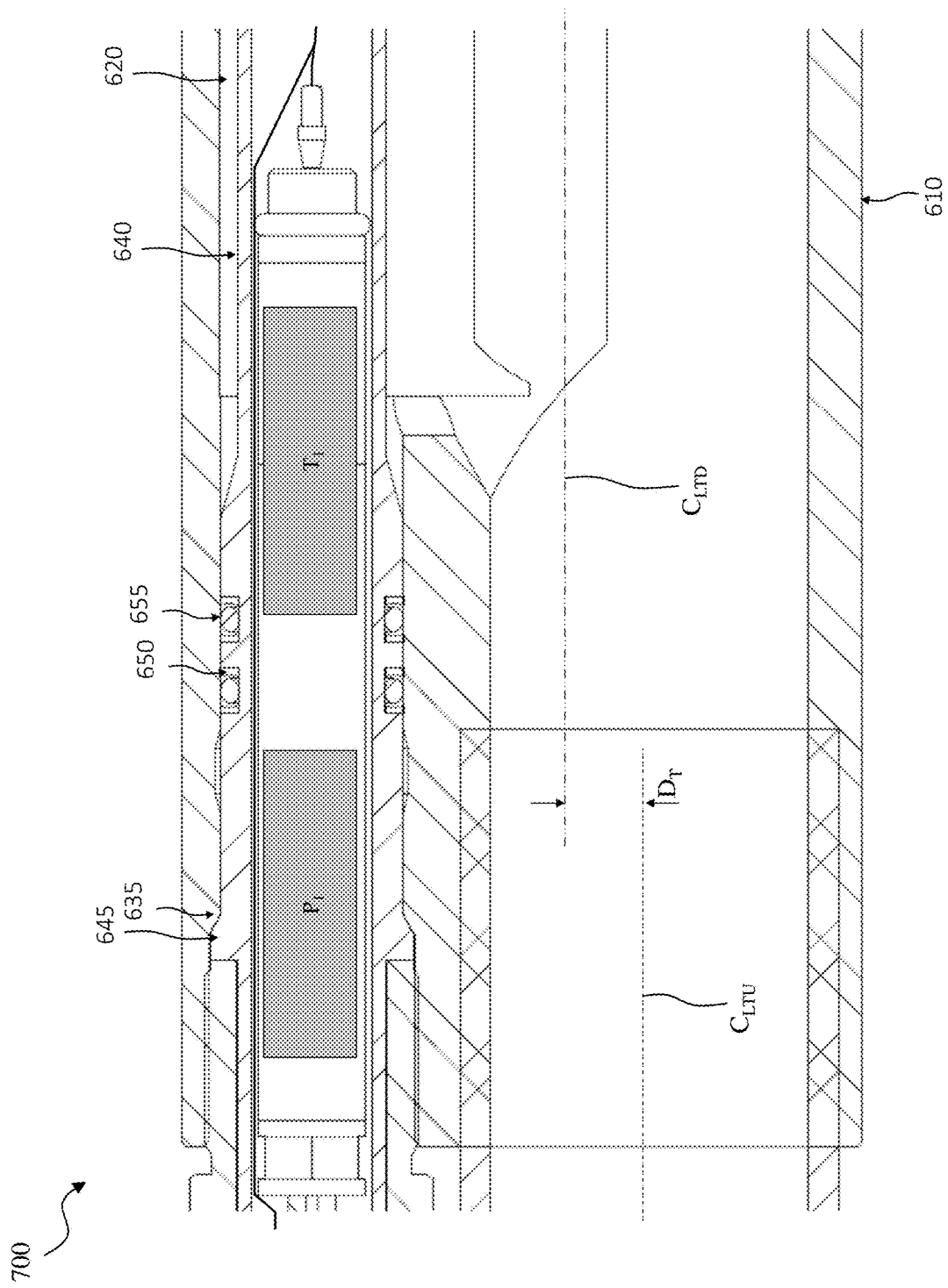
Figure 7D:
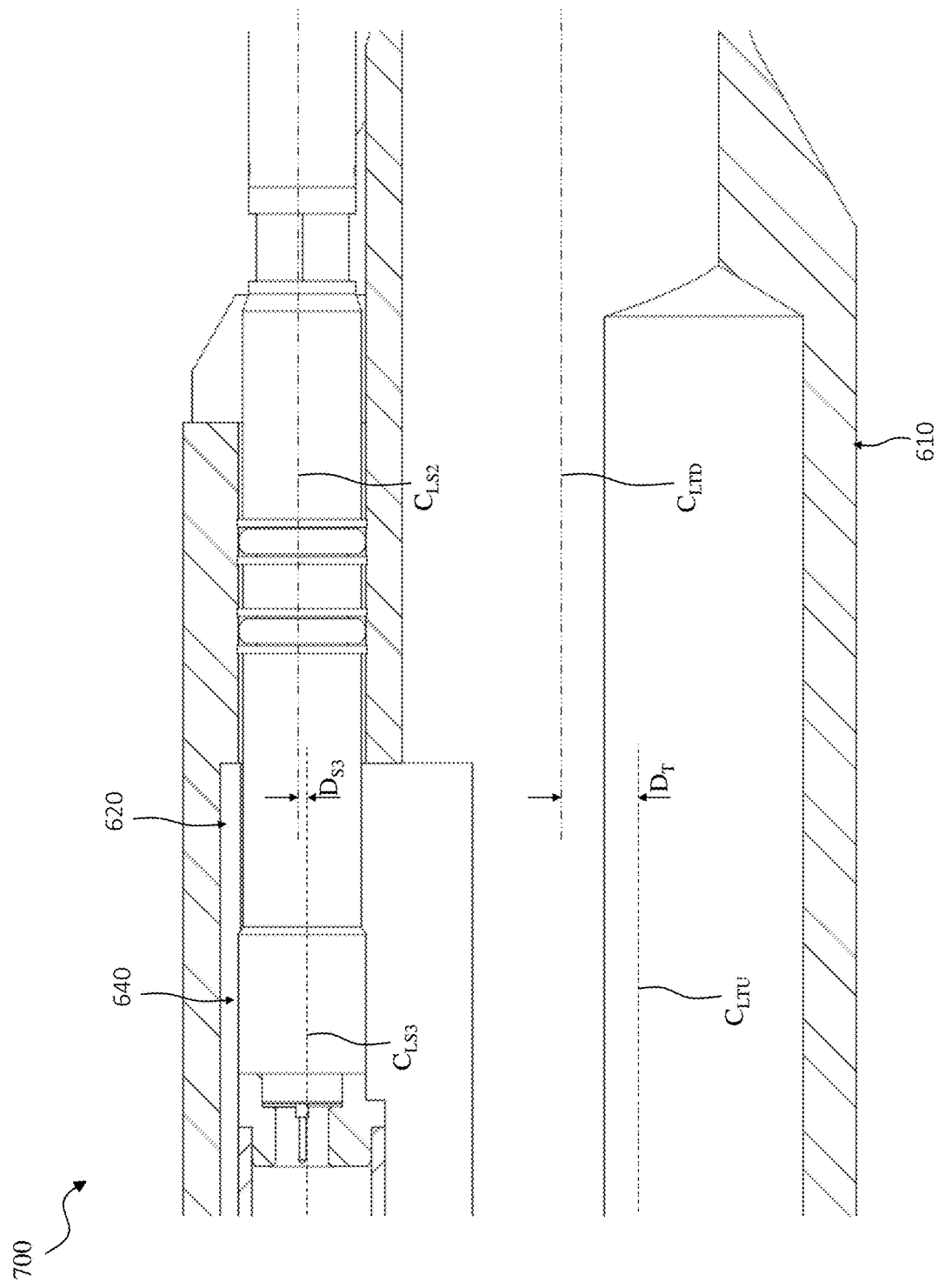
Figure 7E:
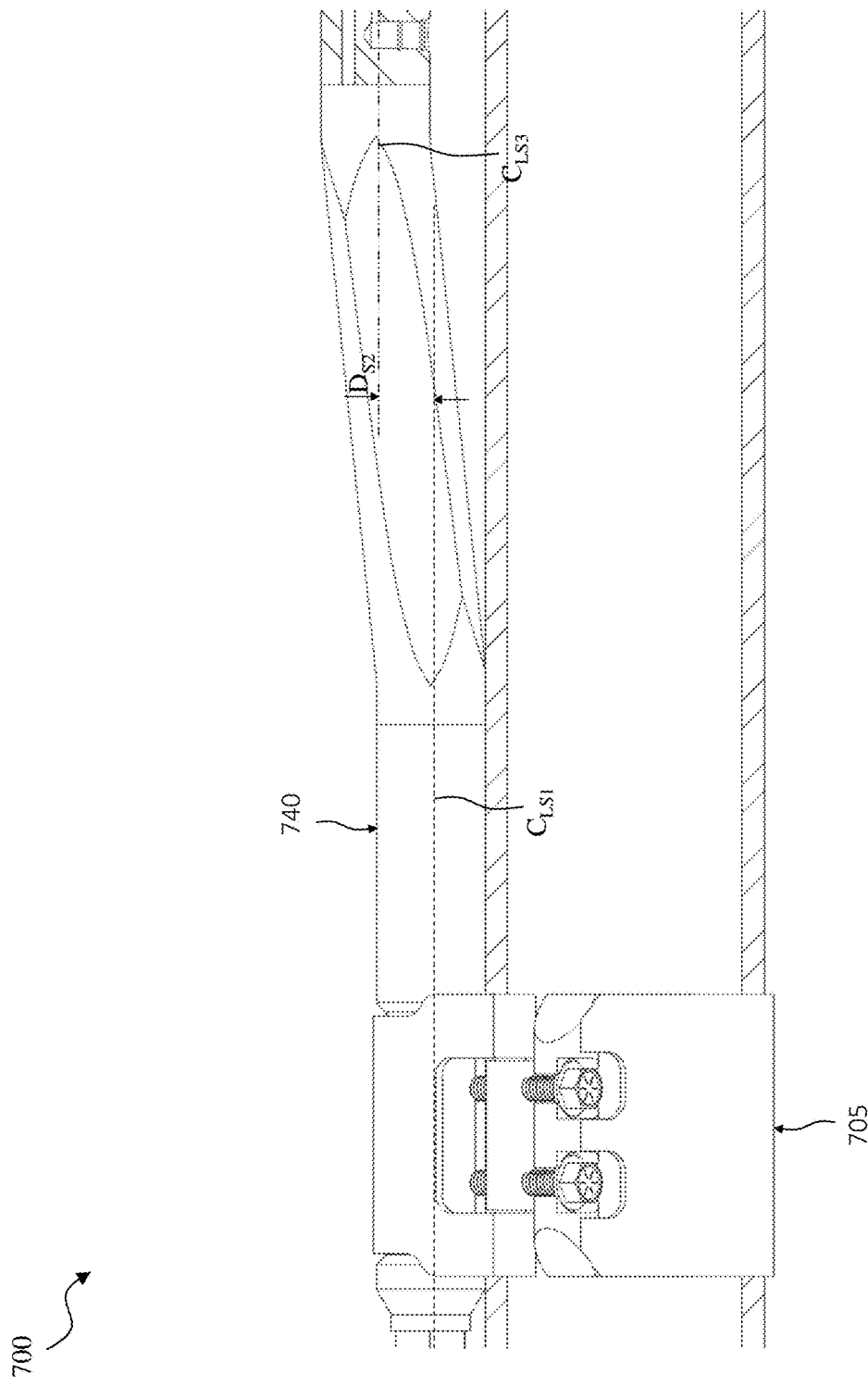
Figure 8B:
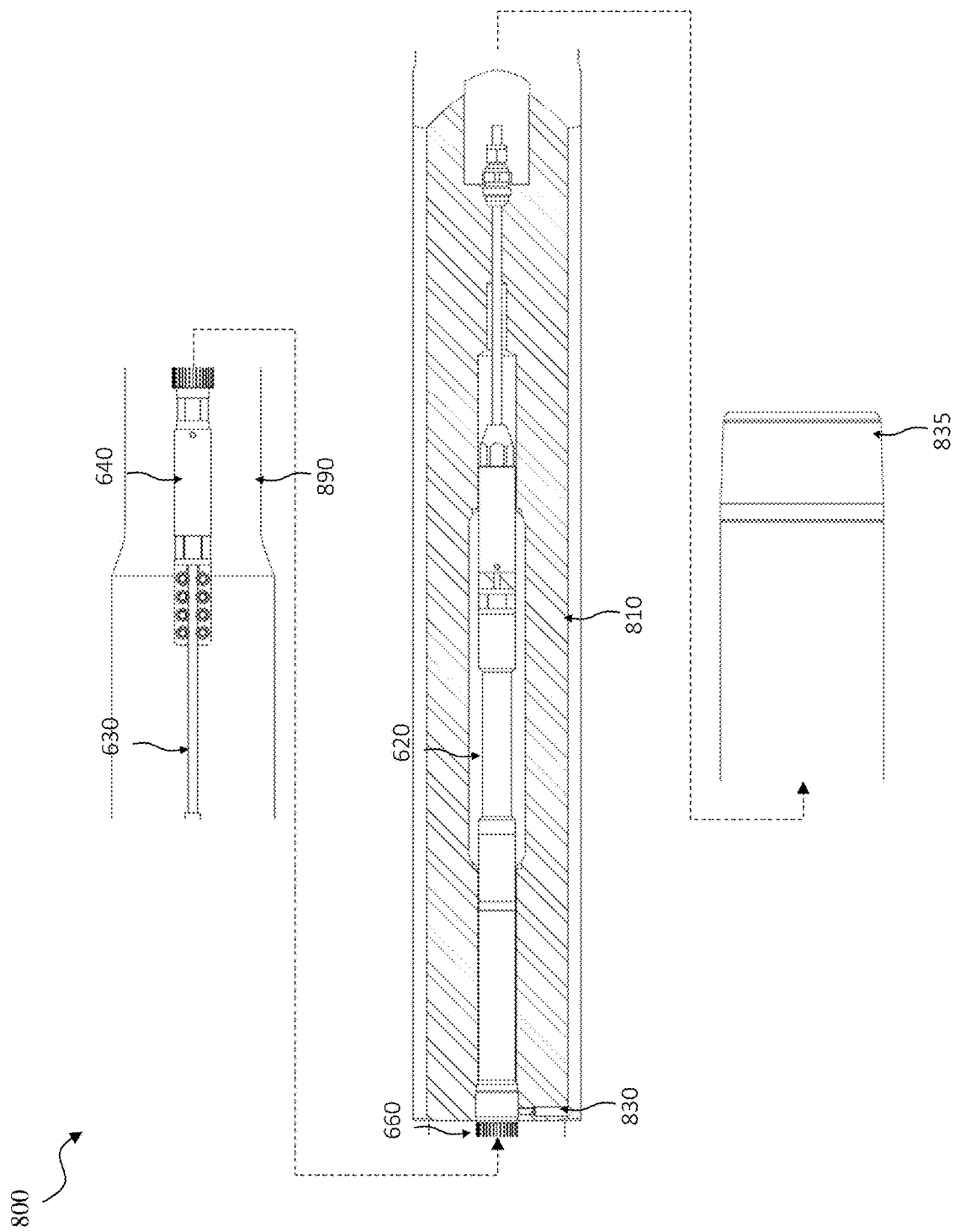
Figure 8C:
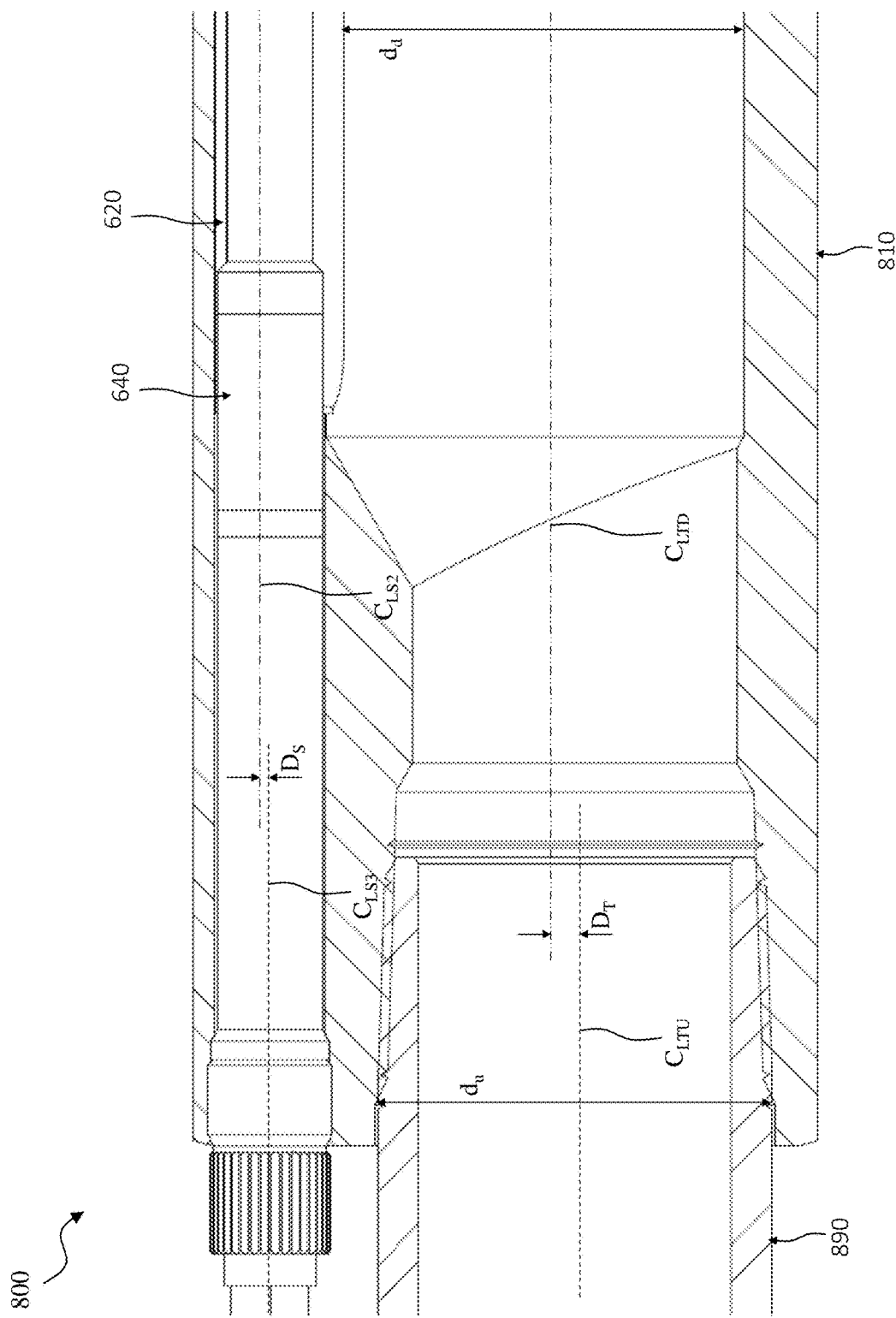
Figure 8D:
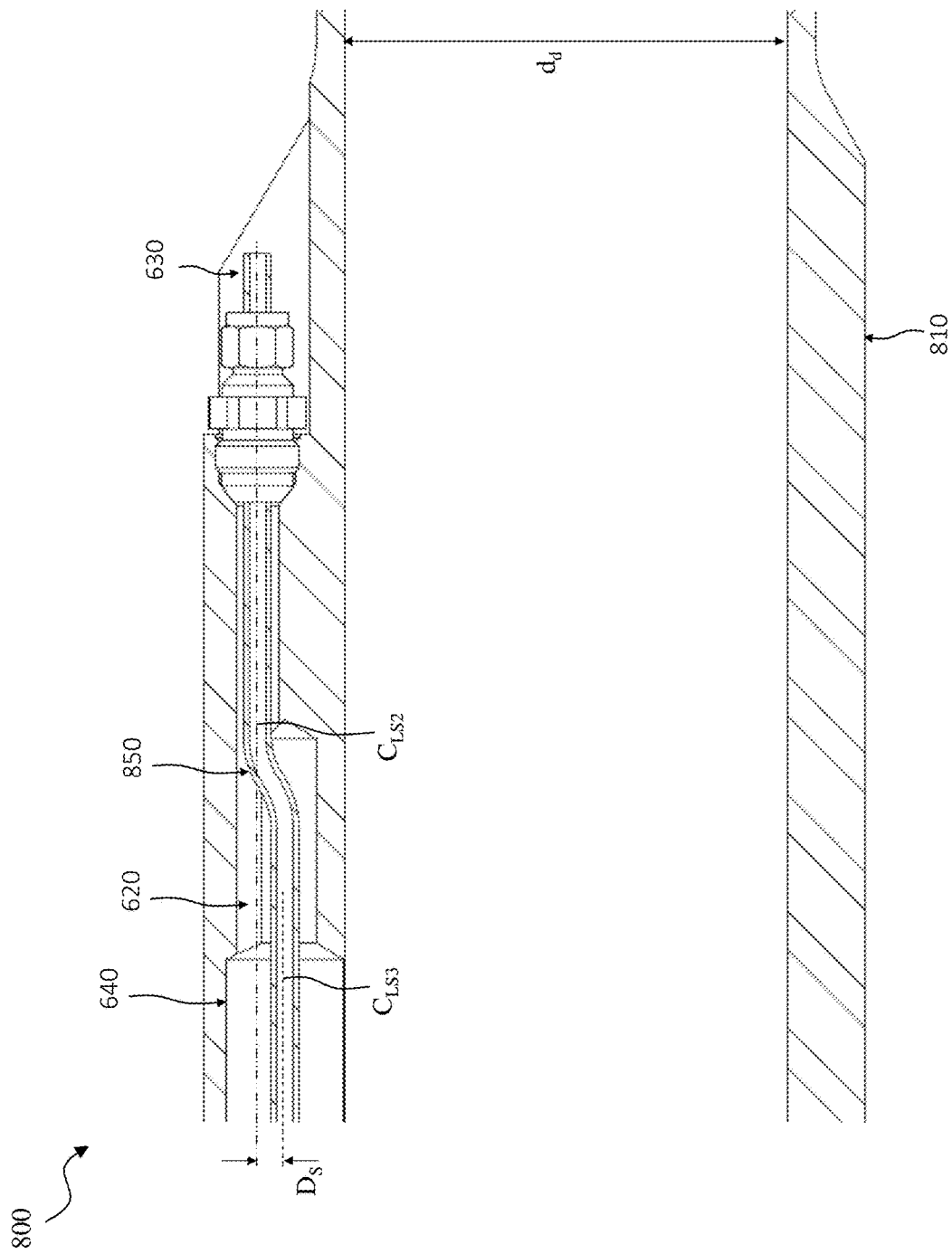

Turning to FIG. 6D, illustrated is a zoomed in cross-sectional view of a portion of the sensing system 600 (e.g., installed sensing system) of FIG. 6A according to any of the embodiments, aspects, applications, variations, designs, etc. disclosed herein. As is evident in the embodiment of FIG. 6D, the first TEC centerline ($C_{LS1}$) and the second TEC centerline ($C_{LS2}$) are offset from one another by a distance ($D_S$).

Turning to FIGS. 7A through 7E, illustrated are cross-sectional views of a sensing system 700 (e.g., installed sensing system) according to any of the embodiments, aspects, applications, variations, designs, etc. disclosed herein. The sensing system 700 is similar in many respects to the sensing system 600 of FIG. 6A. Accordingly, like reference numbers have been used to indicate similar, if not identical, features. The sensing system 700 differs, for the most part, from the sensing system 600, in that the gauge sensor 740 of the sensing system 700 has a sensor region with a sensor region centerline ($C_{LS3}$) that is offset from the first TEC centerline ($C_{LS1}$) and the second TEC centerline ($C_{LS2}$). For example, the sensor region centerline ($C_{LS3}$) may be offset from the first TEC centerline ($C_{LS1}$) by a distance ($D_{S2}$) and offset from the second TEC centerline ($C_{LS2}$) by a distance ($D_{S3}$). In contrast to the sensing system 600, the sensing system 700 may additionally include a TEC termination clamp 705. As those skilled in the art may appreciate, the gauge mandrel 610 and the gauge sensor 740, as well as their features, may be similar to the gauge mandrel(s) and gauge sensor(s) discussed above, and particularly related to FIGS. 2A, 2B, 5A and 5B.

Turning to FIGS. 8A through 8D, illustrated are cross-sectional views of a sensing system 800 (e.g., installed sensing system) according to any of the embodiments, aspects, applications, variations, designs, etc. disclosed herein. The sensing system 800 is similar in many respects to the sensing system 600 of FIG. 6A. Accordingly, like reference numbers have been used to indicate similar, if not identical, features. The sensing system 800 differs, for the most part, from the sensing system 600, in that an internal diameter ($d_u$) of the uphole tubing coupling 830 of the gauge mandrel 810 is less than an internal diameter ($d_d$) of the downhole tubing coupling 835 of the gauge mandrel 810. Furthermore, a crossover sub 890 is coupled to the uphole tubing coupling 830 to reestablish a larger internal diameter at an uphole end thereof. Additionally, the one or more conductors 630 include a bent region 850, the bent region configured to allow the one or more conductors 630 to more easily expand and contract (e.g., in response to changes in temperature) without creating problems. As those skilled in the art may appreciate, the gauge mandrel 610 and the gauge sensor 640, as well as their features, may be similar to the gauge mandrel(s) and gauge sensor(s) discussed above, and particularly related to FIGS. 3A, 3B, 4A and 4B.

Aspects disclosed herein include:
  A. A gauge mandrel for use with a gauge sensor, the gauge mandrel including: 1) a housing having a length ($L_t$), the housing having a main section and an upset section extending outward from the main section; 2) a primary fluid passageway located in the main section of the housing and extending along the length ($L_t$), the primary fluid passageway including an uphole tubing coupling having an uphole tubing coupling centerline ($C_{LTU}$) and a downhole tubing coupling having a downhole tubing coupling centerline ($C_{LTD}$), and further wherein the uphole tubing coupling centerline ($C_{LTU}$) and the downhole tubing coupling centerline ($C_{LTD}$) are offset from one another by a distance ($D_T$); and 3) a gauge cavity located in the upset section of the housing and extending along at least a portion of the length ($L_t$).

B. A sensing system, the sensing system including: 1) a gauge mandrel, the gauge mandrel including; a) a housing having a length ($L_t$), the housing having a main section and an upset section extending outward from the main section; b) a primary fluid passageway located in the main section of the housing and extending along the length ($L_t$), the primary fluid passageway including an uphole tubing coupling having an uphole tubing coupling centerline ($C_{LTU}$) and a downhole tubing coupling having a downhole tubing coupling centerline ($C_{LTD}$), and further wherein the uphole tubing coupling centerline ($C_{LTU}$) and the downhole tubing coupling centerline ($C_{LTD}$) are offset from one another by a distance ($D_T$); and c) a gauge cavity located in the upset section of the housing and extending along at least a portion of the length ($L_t$); and 2) a gauge sensor positioned at least partially within the gauge cavity, the gauge sensor configured to measure temperatures or pressures within the gauge mandrel or outside of the gauge mandrel.

C. A well system, the well system including: 1) a wellbore located in a subterranean formation; 2) uphole production tubing located in the wellbore; 3) a submersible pump located in the wellbore and fluidly coupled to the uphole production tubing; 4) a sensing system located in the wellbore and fluidly coupled to the submersible pump, the sensing system including: a) a gauge mandrel, the gauge mandrel including; i) a housing having a length ($L_t$), the housing having a main section and an upset section extending outward from the main section; ii) a primary fluid passageway located in the main section of the housing and extending along the length ($L_t$), the primary fluid passageway including an uphole tubing coupling having an uphole tubing coupling centerline ($C_{LTU}$) and a downhole tubing coupling having a downhole tubing coupling centerline ($C_{LTD}$), and further wherein the uphole tubing coupling centerline ($C_{LTU}$) and the downhole tubing coupling centerline ($C_{LTD}$) are offset from one another by a distance ($D_T$); and iii) a gauge cavity located in the upset section of the housing and extending along at least a portion of the length ($L_t$); and b) a gauge sensor positioned at least partially within the gauge cavity, the gauge sensor configured to measure temperatures or pressures within the gauge mandrel or outside of the gauge mandrel; and 5) downhole production tubing coupled to the downhole tubing coupling of the gauge mandrel.

D. A gauge sensor for use with a gauge mandrel, the gauge sensor including: 1) a sensor region, the sensor region including one or more pressure sensors or temperature sensors contained therein; 2) a first tubing encapsulated conductor (TEC) termination region coupled to an uphole end of the sensor region, the first TEC termination region including a first TEC termination having a first TEC centerline ($C_{LS1}$); and 3) a second tubing encapsulated conductor (TEC) termination region coupled to a downhole end of the sensor region, the second TEC termination region including a second TEC termination having a second TEC centerline ($C_{LS2}$), and further wherein the first TEC centerline ($C_{LS1}$) and the second TEC centerline ($C_{LS2}$) are offset from one another by a distance ($D_S$).

E. A sensing system, the sensing system including: 1) tubing; 2) a gauge mandrel coupled to the tubing, the gauge mandrel having a gauge cavity with an insertion end; and 3) a gauge sensor positioned within the gauge cavity of the gauge mandrel, the gauge sensor including: a) a sensor region, the sensor region including one or more pressure sensors or temperature sensors contained therein; b) a first tubing encapsulated conductor (TEC) termination region coupled to an uphole end of the sensor region, the first TEC termination region including a first TEC termination having a first TEC centerline ($C_{LS1}$); and c) a second tubing encapsulated conductor (TEC) termination region coupled to a downhole end of the sensor region, the second TEC termination region including a second TEC termination having a second TEC centerline ($C_{LS2}$), and further wherein the first TEC centerline ($C_{LS1}$) and the second TEC centerline ($C_{LS2}$) are offset from one another by a distance ($D_S$).

F. A well system, the well system including: 1) a wellbore located in a subterranean formation; 2) uphole production tubing located in the wellbore; 3) a submersible pump located in the wellbore and fluidly coupled to the uphole production tubing; 4) a sensing system located in the wellbore and fluidly coupled to the submersible pump, the sensing system including: a) a gauge mandrel, the gauge mandrel having a gauge cavity with an insertion end; and b) a gauge sensor positioned within the gauge cavity of the gauge mandrel, the gauge sensor including: i) a sensor region, the sensor region including one or more pressure sensors or temperature sensors contained therein; ii) a first tubing encapsulated conductor (TEC) termination region coupled to an uphole end of the sensor region, the first TEC termination region including a first TEC termination having a first TEC centerline ($C_{LS1}$); and iii) a second tubing encapsulated conductor (TEC) termination region coupled to a downhole end of the sensor region, the second TEC termination region including a second TEC termination having a second TEC centerline ($C_{LS2}$), and further wherein the first TEC centerline ($C_{LS1}$) and the second TEC centerline ($C_{LS2}$) are offset from one another by a distance ($D_S$).

Aspects A, B, C, D, E and F may have one or more of the following additional elements in combination: Element 1: wherein the distance ($D_T$) is at least 1 mm. Element 2: wherein the distance ($D_T$) is at least 12 mm. Element 3: wherein the distance ($D_T$) ranges from 0.5 mm to 30 mm. Element 4: wherein the downhole tubing coupling centerline ($C_{LTD}$) is closer to a top of the upset section than the uphole tubing coupling centerline ($C_{LTU}$) is to the top of the upset section. Element 5: wherein the gauge cavity includes an uphole gauge coupling and a downhole gauge coupling, and further wherein the uphole gauge coupling has an uphole gauge coupling centerline ($C_{LGU}$) and the downhole gauge coupling has a downhole gauge coupling centerline ($C_{LGD}$), and further wherein the uphole gauge coupling centerline ($C_{LGU}$) and the downhole gauge coupling centerline ($C_{LGD}$) are offset from one another by a distance ($D_G$). Element 6: wherein the distance ($D_G$) is at least 0.5 mm. Element 7: wherein the distance ($D_G$) ranges from 0.3 mm to 10 mm. Element 8: wherein the downhole gauge coupling centerline ($C_{LGD}$) is closer to a top of the upset section than the uphole gauge coupling centerline ($C_{LGU}$) is to the top of the upset section. Element 9: further including one or more fluid passageways coupling the primary fluid passageway and the gauge cavity. Element 10: wherein the distance ($D_T$) is at least 1 mm. Element 11: wherein the distance ($D_T$) ranges from 0.5 mm to 30 mm. Element 12: wherein the downhole tubing coupling centerline ($C_{LTD}$) is closer to a top of the upset section than the uphole tubing coupling centerline ($C_{LTU}$) is to the top of the upset section. Element 13: wherein, the gauge cavity includes an uphole gauge coupling and a downhole gauge coupling, and further wherein the uphole gauge coupling has an uphole gauge coupling centerline ($C_{LGU}$) and the downhole gauge coupling has a downhole gauge coupling centerline ($C_{LGD}$), and further wherein the uphole gauge coupling centerline ($C_{LGU}$) and the downhole gauge coupling centerline ($C_{LGD}$) are offset from one another by a distance ($D_G$). Element 14: wherein the distance ($D_G$) is at least 0.5 mm. Element 15: wherein the distance ($D_G$) ranges from 0.3 mm to 10 mm. Element 16: wherein the downhole gauge coupling centerline ($C_{LGD}$) is closer to a top of the upset section than the uphole gauge coupling centerline ($C_{LGU}$) is to the top of the upset section. Element 17: further including one or more fluid passageways coupling the primary fluid passageway and the gauge cavity. Element 18: wherein the distance ($D_S$) is at least 0.5 mm. Element 19: wherein the distance ($D_S$) ranges from 0.3 mm to 10 mm. Element 20: wherein the sensor region includes an internal wire passage coupling the first TEC termination region and the second TEC termination region. Element 21: wherein the sensor region includes a first pressure sensor configured to measure a first fluid pressure outside of a mandrel that the gauge sensor is located and a second pressure sensor configured to measure a second fluid pressure inside a mandrel that the gauge sensor is located. Element 22: wherein the sensor region includes a first port coupling the first pressure sensor and the outside of the mandrel, and a second port coupling the second pressure sensor and the inside of the mandrel. Element 23: further including a first seal region coupled to the first TEC termination region, the first seal region including a gauge sensor angled surface configured to couple with a gauge mandrel angled surface of a gauge cavity that the gauge sensor is configured to insert within. Element 24: wherein the first seal region further includes one or more first seal grooves configured to position one or more first seals. Element 25: further including a second seal region coupled to the second TEC termination region, the second seal region including one or more second seal grooves configured to position one or more second seals. Element 26: wherein the sensor region has a sensor region centerline ($C_{LS3}$), and further wherein the sensor region centerline ($C_{LS3}$) is offset from the first TEC centerline ($C_{LS1}$) and the second TEC centerline ($C_{LS2}$).

Those skilled in the art to which this application relates will appreciate that other and further additions, deletions, substitutions and modifications may be made to the described embodiments.

What is claimed is:

1. A gauge sensor for use with a gauge mandrel, comprising:
   a sensor region, the sensor region including one or more pressure sensors or temperature sensors contained therein;
   a first tubing encapsulated conductor (TEC) termination region coupled to an uphole end of the sensor region, the first TEC termination region including a first TEC termination having a first TEC centerline ($C_{LS1}$); and
   a second tubing encapsulated conductor (TEC) termination region coupled to a downhole end of the sensor region, the second TEC termination region including a second TEC termination having a second TEC centerline ($C_{LS2}$), and further wherein the first TEC centerline ($C_{LS1}$) and the second TEC centerline ($C_{LS2}$) are offset from one another by a distance ($D_S$), wherein the distance (DS) is at least 0.5 mm.

2. The gauge sensor as recited in claim 1, wherein the sensor region includes an internal wire passage coupling the first TEC termination region and the second TEC termination region.

3. The gauge sensor as recited in claim 1, wherein the sensor region includes a first pressure sensor configured to measure a first fluid pressure outside of a mandrel that the gauge sensor is located and a second pressure sensor configured to measure a second fluid pressure inside a mandrel that the gauge sensor is located.

4. The gauge sensor as recited in claim 3, wherein the sensor region includes a first port coupling the first pressure sensor and the outside of the mandrel, and a second port coupling the second pressure sensor and the inside of the mandrel.

5. The gauge sensor as recited in claim 1, further including a first seal region coupled to the first TEC termination region, the first seal region including a gauge sensor angled surface configured to couple with a gauge mandrel angled surface of a gauge cavity that the gauge sensor is configured to insert within.

6. The gauge sensor as recited in claim 5, wherein the first seal region further includes one or more first seal grooves configured to position one or more first seals.

7. The gauge sensor as recited in claim 5, further including a second seal region coupled to the second TEC termination region, the second seal region including one or more second seal grooves configured to position one or more second seals.

8. The gauge sensor as recited in claim 1, wherein the sensor region has a sensor region centerline ($C_{LS3}$), and further wherein the sensor region centerline ($C_{LS3}$) is offset from the first TEC centerline ($C_{LS1}$) and the second TEC centerline ($C_{LS2}$).

9. A sensing system, comprising:
   tubing;
   a gauge mandrel coupled to the tubing, the gauge mandrel having a gauge cavity with an insertion end; and
   a gauge sensor positioned within the gauge cavity of the gauge mandrel, the gauge sensor including:
   a sensor region, the sensor region including one or more pressure sensors or temperature sensors contained therein;
   a first tubing encapsulated conductor (TEC) termination region coupled to an uphole end of the sensor region, the first TEC termination region including a first TEC termination having a first TEC centerline ($C_{LS1}$); and
   a second tubing encapsulated conductor (TEC) termination region coupled to a downhole end of the sensor region, the second TEC termination region including a second TEC termination having a second TEC centerline ($C_{LS2}$), and further wherein the first TEC centerline ($C_{LS1}$) and the second TEC centerline ($C_{LS2}$) are offset from one another by a distance ($D_S$), wherein the distance (DS) is at least 0.5 mm.

10. The sensing system as recited in claim 9, wherein the sensor region includes an internal wire passage coupling the first TEC termination region and the second TEC termination region.

11. The sensing system as recited in claim 9, wherein the sensor region includes a first pressure sensor configured to measure a first fluid pressure outside of a mandrel that the gauge sensor is located and a second pressure sensor configured to measure a second fluid pressure inside a mandrel that the gauge sensor is located.

12. The sensing system as recited in claim 11, wherein the sensor region includes a first port coupling the first pressure sensor and the outside of the mandrel, and as second port coupling the second pressure sensor and the inside of the mandrel.

13. The sensing system as recited in claim 9, further including a first seal region coupled to the first TEC termination region, the first seal region including a gauge sensor angled surface configured to couple with a gauge mandrel angled surface of the gauge cavity.

14. The sensing system as recited in claim 13, wherein the first seal region further includes one or more first seal grooves configured to position one or more first seals.

15. The sensing system as recited in claim 13, further including a second seal region coupled to the second TEC termination region, the second seal region including one or more second seal grooves configured to position one or more second seals.

16. The sensing system as recited in claim 9, wherein the sensor region has a sensor region centerline ($C_{LS3}$), and further wherein the sensor region centerline ($C_{LS3}$) is offset from the first TEC centerline ($C_{LS1}$) and the second TEC centerline ($C_{LS2}$).

17. A well system, comprising:
a wellbore located in a subterranean formation;
uphole production tubing located in the wellbore;
a submersible pump located in the wellbore and fluidly coupled to the uphole production tubing;
a sensing system located in the wellbore and fluidly coupled to the submersible pump, the sensing system including:
  a gauge mandrel, the gauge mandrel having a gauge cavity with an insertion end; and
  a gauge sensor positioned within the gauge cavity of the gauge mandrel, the gauge sensor including:
    a sensor region, the sensor region including one or more pressure sensors or temperature sensors contained therein;
    a first tubing encapsulated conductor (TEC) termination region coupled to an uphole end of the sensor region, the first TEC termination region including a first TEC termination having a first TEC centerline ($C_{LS1}$); and
    a second tubing encapsulated conductor (TEC) termination region coupled to a downhole end of the sensor region, the second TEC termination region including a second TEC termination having a second TEC centerline ($C_{LS2}$), and further wherein the first TEC centerline ($C_{LS1}$) and the second TEC centerline ($C_{LS2}$) are offset from one another by a distance ($D_S$), wherein the distance (DS) is at least 0.5 mm.

18. A gauge sensor for use with a gauge mandrel, comprising:
a sensor region, the sensor region including one or more pressure sensors or temperature sensors contained therein;
a first tubing encapsulated conductor (TEC) termination region coupled to an uphole end of the sensor region, the first TEC termination region including a first TEC termination having a first TEC centerline ($C_{LS1}$); and
a second tubing encapsulated conductor (TEC) termination region coupled to a downhole end of the sensor region, the second TEC termination region including a second TEC termination having a second TEC centerline ($C_{LS2}$), and further wherein the first TEC centerline ($C_{LS1}$) and the second TEC centerline ($C_{LS2}$) are offset from one another by a distance ($D_S$), wherein the distance ($D_S$) ranges from 0.3 mm to 10 mm.

19. A sensing system, comprising:
tubing;
a gauge mandrel coupled to the tubing, the gauge mandrel having a gauge cavity with an insertion end; and
a gauge sensor positioned within the gauge cavity of the gauge mandrel, the gauge sensor including:
  a sensor region, the sensor region including one or more pressure sensors or temperature sensors contained therein;
  a first tubing encapsulated conductor (TEC) termination region coupled to an uphole end of the sensor region, the first TEC termination region including a first TEC termination having a first TEC centerline ($C_{LS1}$); and
  a second tubing encapsulated conductor (TEC) termination region coupled to a downhole end of the sensor region, the second TEC termination region including a second TEC termination having a second TEC centerline ($C_{LS2}$), and further wherein the first TEC centerline ($C_{LS1}$) and the second TEC centerline ($C_{LS2}$) are offset from one another by a distance ($D_S$,), wherein the distance ($D_S$) ranges from 0.3 mm to 10 mm.

* * * * *